United States Patent
Ruissen et al.

(10) Patent No.: US 10,844,981 B2
(45) Date of Patent: Nov. 24, 2020

(54) PRESS FITTING FOR PIPES HAVING A CHECK RING

(71) Applicant: VSH Fittings B.V., Hilversum (NL)

(72) Inventors: Johannes Ruissen, Naarden (NL); Andreas Hubertus Hullegien, Vleuten (NL)

(73) Assignee: VSH Fittings B.V., Hilversum (NL)

( * ) Notice: Subject to any disclaimer, the term of this patent is extended or adjusted under 35 U.S.C. 154(b) by 406 days.

(21) Appl. No.: 15/757,395

(22) PCT Filed: Sep. 6, 2016

(86) PCT No.: PCT/NL2016/050618
§ 371 (c)(1),
(2) Date: Mar. 5, 2018

(87) PCT Pub. No.: WO2017/043966
PCT Pub. Date: Mar. 16, 2017

(65) Prior Publication Data
US 2019/0024827 A1    Jan. 24, 2019

(30) Foreign Application Priority Data
Sep. 8, 2015    (NL) .................................... 2015413

(51) Int. Cl.
*F16L 13/14*    (2006.01)
*F16L 37/091*    (2006.01)

(52) U.S. Cl.
CPC ........... *F16L 13/142* (2013.01); *F16L 37/091* (2013.01); *F16L 2201/10* (2013.01)

(58) Field of Classification Search
CPC ....... F16L 13/14; F16L 13/142; F16L 37/091; F16L 2201/10
USPC ............................. 285/382, 3, 399, 400, 93
See application file for complete search history.

(56) References Cited

U.S. PATENT DOCUMENTS

| | | | |
|---|---|---|---|
| 2003/0038481 A1* | 2/2003 | Viegener ............... | F16L 13/142 285/382 |
| 2011/0049875 A1* | 3/2011 | Stults .................... | F16L 13/142 285/345 |
| 2012/0001414 A1* | 1/2012 | Arning .................. | F16L 13/147 285/3 |

(Continued)

FOREIGN PATENT DOCUMENTS

| | | |
|---|---|---|
| EP | 0955493 A1 | 11/1999 |
| EP | 1547728 A1 | 6/2005 |

(Continued)

*Primary Examiner* — Aaron M Dunwoody
(74) *Attorney, Agent, or Firm* — Hoffmann & Baron, LLP

(57) ABSTRACT

A press fitting for pipes includes a socket with an insert opening for a pipe end. An annular groove-shaped space present in a press wall part of a press region is delimited by a limitation edge. A gripping ring is placed in the groove-shaped space. The press region is deformable from a non-compressed state a compressed state by a radially inward directed pressing action causing the press wall part to radially compress and the gripping ring to grip the pipe end. A check ring is provided which has one or more break segments and a coupling part. The break segments can be forced to break free by the pressing action, while the coupling part then comes to lie visible at least partly in between the limitation edge and the pipe end.

26 Claims, 32 Drawing Sheets

(56) References Cited

U.S. PATENT DOCUMENTS

| | | | | |
|---|---|---|---|---|
| 2015/0137515 A1* | 5/2015 | Ratschmann | ......... | F16L 37/091 285/340 |
| 2015/0308595 A1* | 10/2015 | Lee | ......... | F16L 21/08 285/349 |
| 2019/0170277 A1* | 6/2019 | Kost | ......... | F16L 13/142 |
| 2019/0293211 A1* | 9/2019 | Lee | ......... | F16L 13/14 |

FOREIGN PATENT DOCUMENTS

| | | |
|---|---|---|
| EP | 1593899 A1 | 11/2005 |
| EP | 2133612 A2 | 12/2009 |
| WO | 2010/089188 A1 | 8/2010 |
| WO | 2014/008932 A1 | 1/2014 |

* cited by examiner

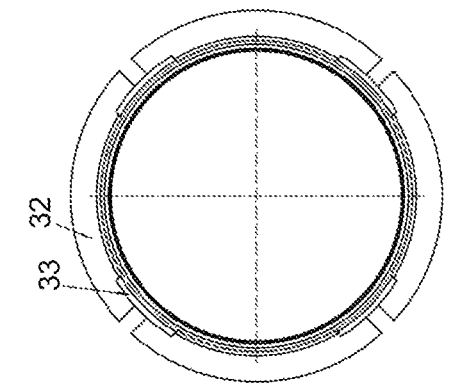
FIG. 3e
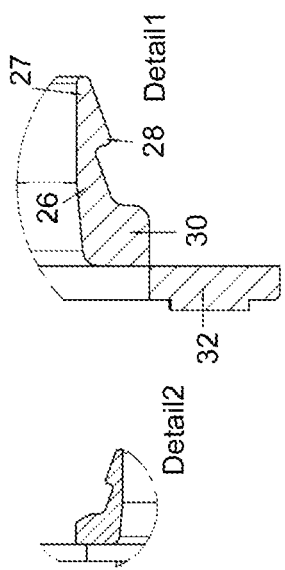
FIG. 3g
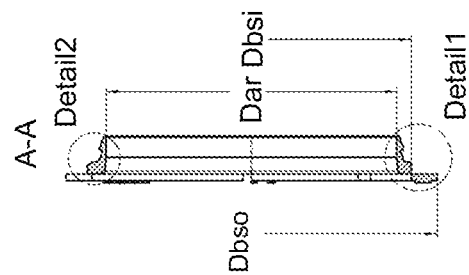
FIG. 3d
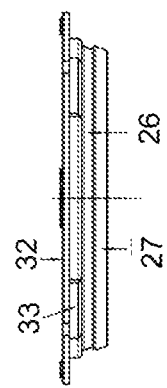
FIG. 3f
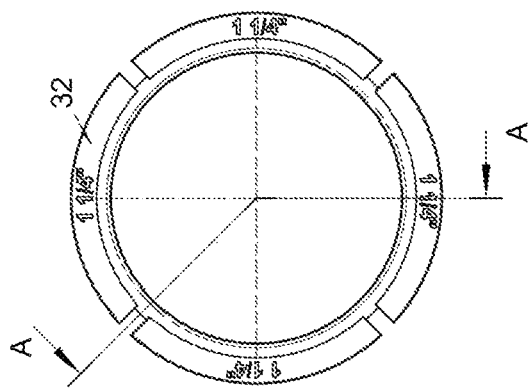
FIG. 3b
FIG. 3c

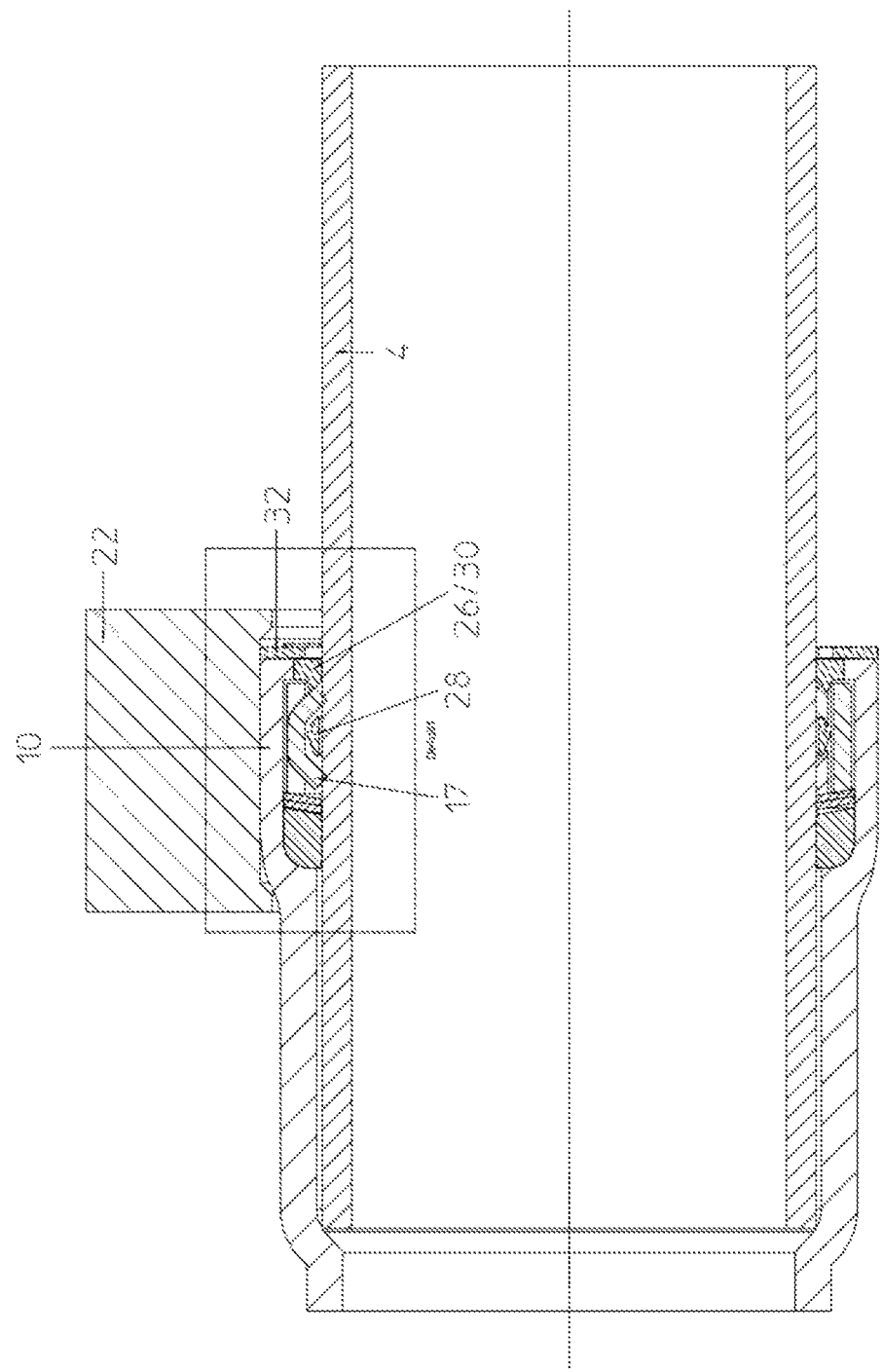
Fig. 4.1

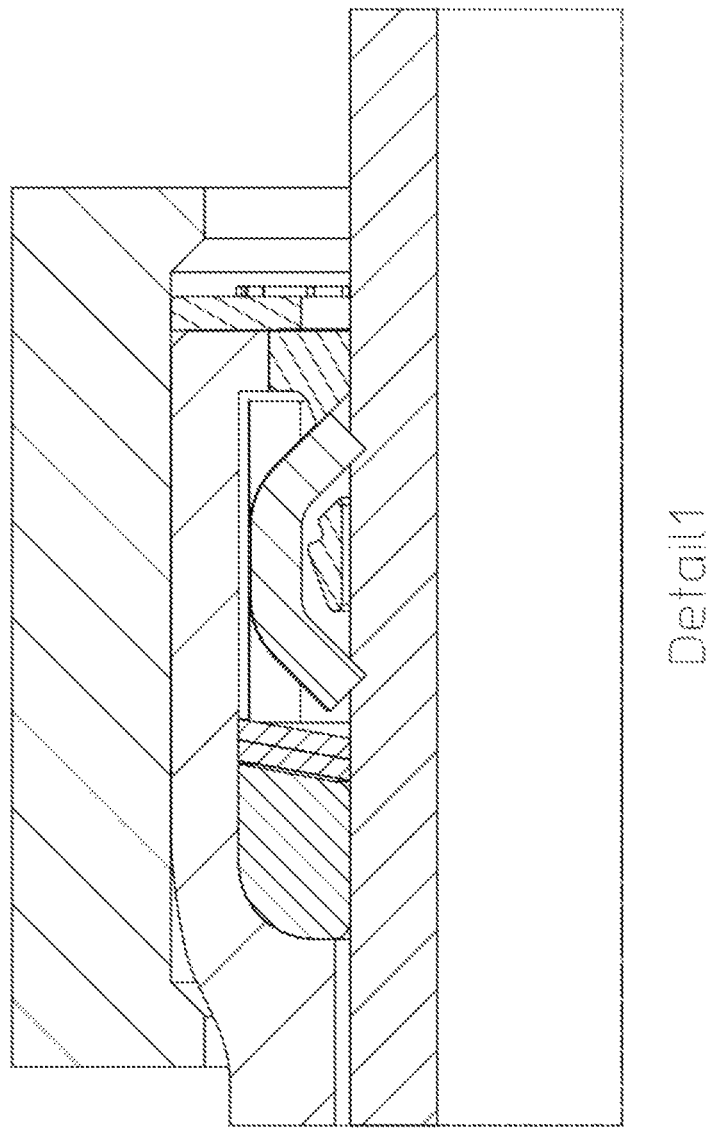
Fig. 4.1a

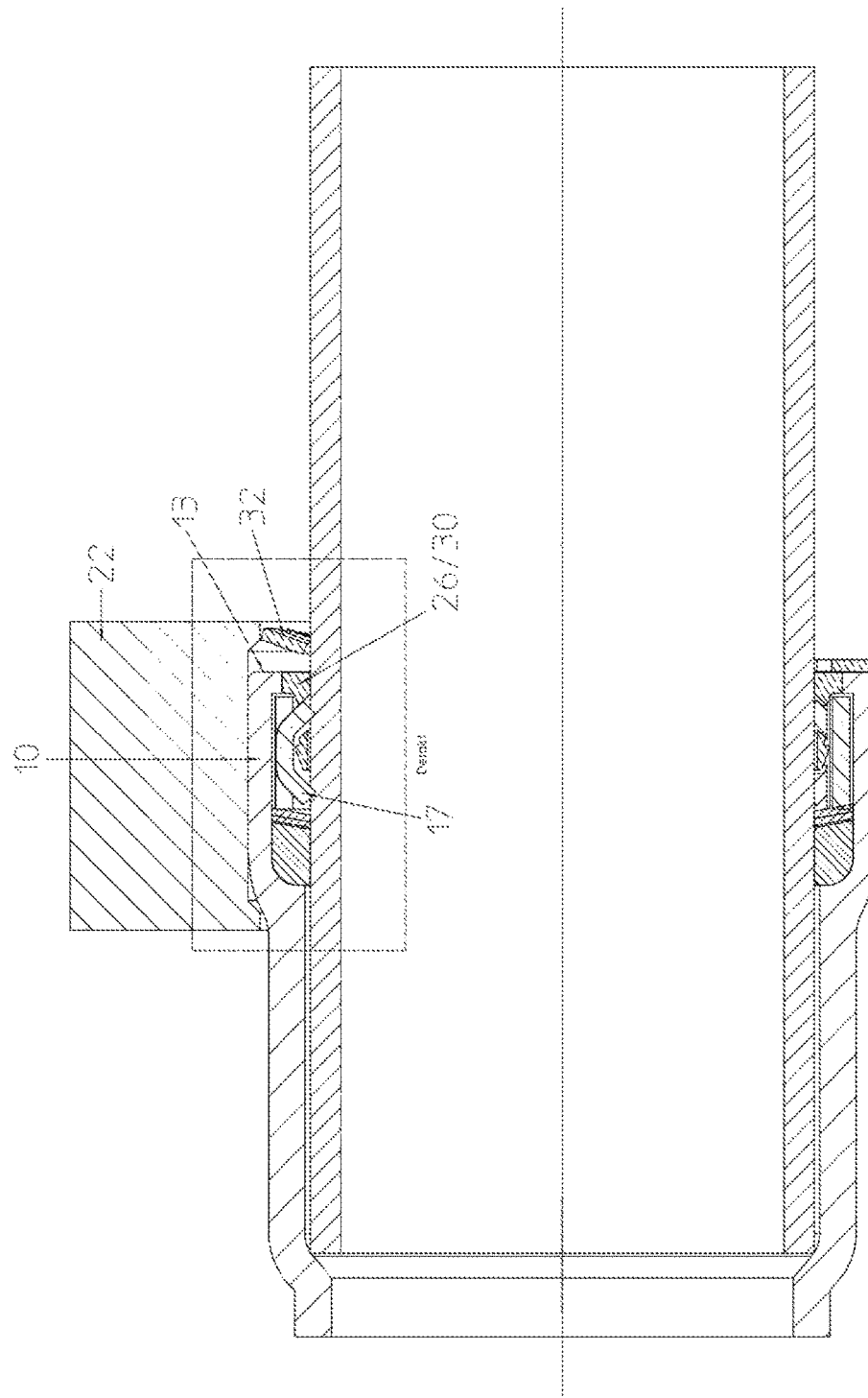
Fig. 4.2

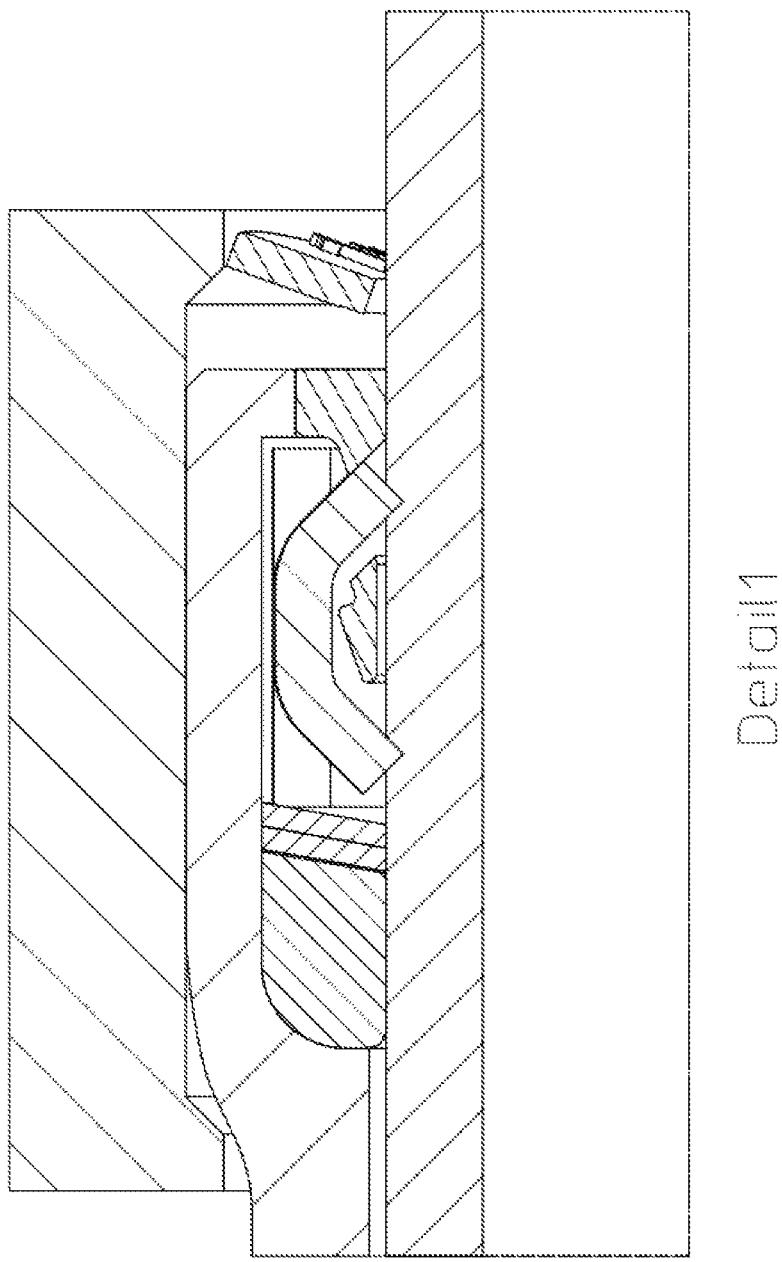
Fig. 4.2a

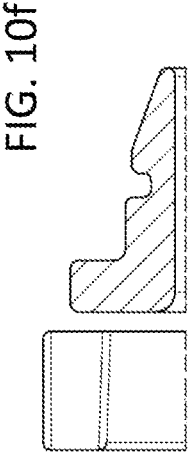
FIG. 10f
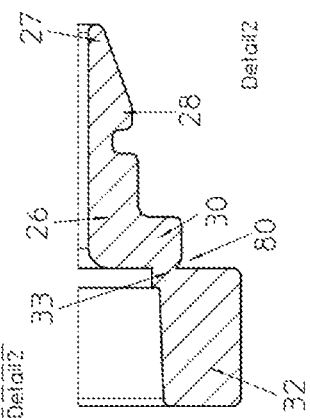
FIG. 10e
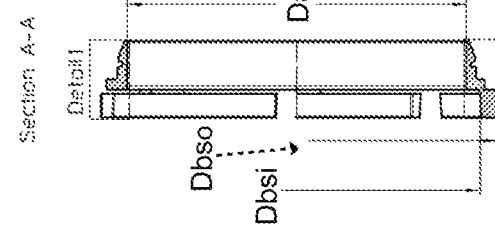
FIG. 10d
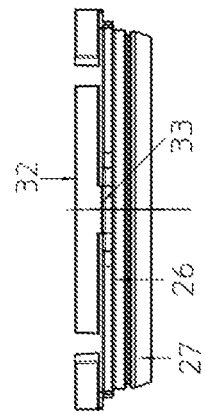
FIG. 10g
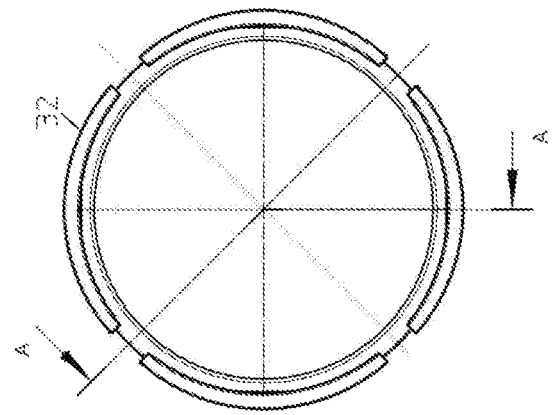
FIG. 10b
FIG. 10c

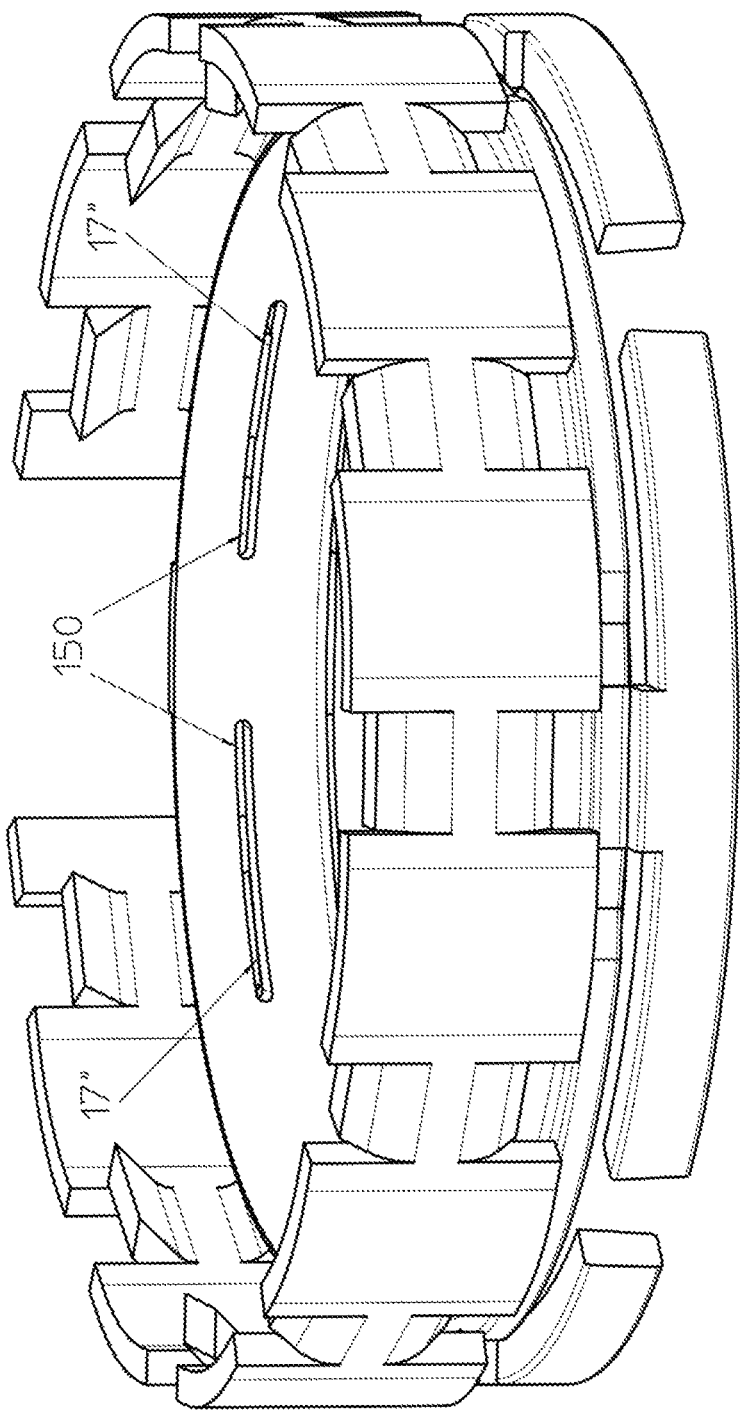

PRESS FITTING FOR PIPES HAVING A CHECK RING

CROSS-REFERENCE TO RELATED APPLICATIONS

This application is the National Stage of International Application No. PCT/NL2016/050618, filed Sep. 6, 2016, which claims the benefit of Netherlands Application No. NL 2015413, filed Sep. 8, 2015, the contents of which is incorporated by reference herein.

FIELD OF THE INVENTION

The present invention relates to press fittings for pipes which have sockets with compressible press regions inside which a distinctive gripping ring is placed such that pipe ends can be inserted therein after which the press fittings can be press fitted from a non-compressed state into a compressed state by means of a suitable pressing action exerted upon those press regions by complementary pressing tools.

BACKGROUND OF THE INVENTION

Such press fittings are known in a wide variety of embodiments. For example EP-0.955.493 discloses a press fitting which comprises a socket with a central insertion opening into which a complementary pipe end can be inserted. The central insertion opening has an insert region and a press region. The insert region lies axially inwards, is relative thick-walled and is dimensioned such that an inserted pipe end can come to lie abutting therein with only a minimum amount of circumferential play. The press region lies axially outwards, is relative thin-walled and presents a widened annular groove-shaped space in which a first sealing ring, a spacer ring, a second sealing ring and a gripping ring are placed. At its axial outward end the groove-shaped space is delimited by a radially inwards flared edge of the press region. At its axial inward end the groove-shaped space is delimited by a transitional wall part which extends between the insert region and press region. In the non-compressed state, radial inner dimensions of the rings are such that an inserted pipe end can come to lie therein with only a minimum amount of circumferential play. The press region is compressible from the non-compressed state towards the compressed state by a radially inward directed pressing action exerted upon an outer wall of the press region. In the compressed state, grasping teeth of the gripping ring get to couple with the inserted pipe end and the sealing rings get to lie sealing against the inserted pipe end.

A disadvantage herewith is that it cannot be checked whether or not the fitting has already been properly pressed. Furthermore, during insertion and during the pressing action, the pipe end has a tendency to get misaligned with a central axis of the socket. During the pressing action this has the drawback that a pressed assembly of press fitting and pipe end is obtained which is not neatly lined-up but which run oblique relative to each other. Another disadvantage is that the insertion of the pipe end may be hindered somewhat by the slanting outwardly projecting grasping teeth of the gripping ring. Yet another disadvantage is that a gap remains at a front side of the fitting between the flared edge and the inserted pipe end. Dirt and the like can easily accumulate there during use.

Another example of a press fitting is disclosed in WO 2010/089188. Here the press fitting comprises a socket with an annular groove-shaped space present inside a widened thin-walled press region. At its axial outward end the groove-shaped space is delimited by a plurality of inter-spaced inwardly projecting stop segments. At its axial inward end the groove-shaped space is delimited by a transitional wall part which extends between the insert region and press region. A sealing ring, a spacer ring and a gripping ring are placed side by side in the groove-shaped space.

Here substantially the same disadvantages go as for EP-0.955.493, that is to say that it cannot be checked whether the fitting has already been pressed or not, and that it is rather unpredictable to properly position the inserted pipe end inside the socket of the press fitting and keep it properly positioned therein during pressing. Furthermore here also the grasping teeth may stand in the way of insertion of the pipe end, and a gap remains at the front end of the fitting after pressing.

It is noted that a use of distinctive check rings for being able to control whether a pressing action has been performed or not, are already known from the state of the art for press fittings. For example EP-1 547 728 discloses a press fitting in which a check ring has been placed externally over the fitting while lying against a bulb section thereof. During pressing of the fitting a pressing jaw is used which is designed to deform both the fitting and the inserted pipe end at two sides of a sealing ring. Furthermore the pressing jaw is equipped with ribs for at the same time cutting through the check ring. In EP-2 133 612 a press fitting is shown to which a check ring is connected such that it partly extends inside and outside of a radially inward directed annular web. During pressing this radially inward directed web gets to bite into an outer side of the pipe end while at the same time getting to cut through the check ring.

Both of them however are not usable for press fittings of the type according to the present invention. For example the way they get to grip an inserted pipe end differs. They do not comprise a distinctive gripping ring placed inside a groove-shaped space. Furthermore, their check rings are relative vulnerable to getting damaged even before a pressing action has taken place at all. This could give an installer the wrong impression that a pressing action has already been performed. Also it is noted that the check ring according to EP-1 547 728 needs a specially modified pressing tool with ribs for cutting through the check ring, whereas the one according to EP-2 133 612 requires the relative blunt radially inwardly directed annular web to cut through the check ring. Only after the separation has been completed, the web can start to grip itself into the inserted pipe end. Finally it is noticed that for both of the known check rings it remains uncertain for an installer whether or not a pressing action has taken place or not. It can also be the case that during production someone had forgotten to place the check ring in the first place, or that during transport of the fitting the check ring has accidentally fallen off. After the pressing action has been completed either the entire check ring falls off (EP-1 547 728) or its remaining part is not visible from the outside (EP-2 133 612). There is only a slight visible difference between an non-pressed fitting without the check ring and a pressed fitting with the check ring.

SUMMARY OF THE INVENTION

The present invention aims to at least partially overcome the above disadvantages or to provide a usable alternative. In particular the present invention aims to provide a user-friendly reliable press fitting of the type which comprises a distinctive gripping ring and which is able to provide a predictable and reliable deformation behaviour during a pressing action and which is provided with a user-friendly reliable check function such that a proper performance of the pressing action can easily be controlled.

This aim is achieved by a press fitting according to the present invention. The press fitting comprises a socket with an insertion space with an insert opening for having a pipe end inserted therein. The insertion space has a press region which is delimited by a substantially cylindrical press wall part. An annular groove-shaped space is present in the press wall part. The annular groove-shaped space is delimited towards the insert opening by a radially inwardly projecting limitation edge of the press wall part. A gripping ring is placed in the annular groove-shaped space. The press region is deformable from a non-compressed state towards a compressed state by a radially inward directed pressing action causing the press wall part to radially compress and the gripping ring to grip an inserted pipe end. According to the inventive thought a check ring is provided at the side of the insert opening. The check ring comprises one or more break segments and a coupling part. The coupling part extends inside the insertion space and lies at least partly in between the limitation edge and the inserted pipe end. The one or more break segments are connected to the coupling part by means of one or more separation parts such that the one or more break segments are forced to break free by means of shear forces along those one or more separation parts from the coupling part by the pressing action. The coupling part in the compressed state automatically comes to lie visible at least partly in between the limitation edge and the inserted pipe end.

The one or more break segments are advantageously positioned for automatically breaking free along the one or more separation parts from the rest of the check ring as soon as the pressing action is performed. Thus it becomes immediately clearly visible whether or not a pressing action of the press fitting indeed has taken place, particularly because the coupling part then becomes visible. If an installer accidentally has forgotten to press the fitting, then the one or more break segments are still intact and visible at or from a front side of the fitting. If an installer indeed has pressed the fitting, then the one or more break segments have fallen off while the coupling part has remained seated and has even become more visible between the limitation edge and the inserted pipe end. Thus the installer can doubly check in two different manners at one and the same time that the pressing indeed has taken place. It is even possible to equip the coupling part with a distinctive colour or the like such that the installer can more easily detect it in the compressed state. Also such a distinctive colour can make it visible to the installer what kind of fitting has been used. Another advantage of the invention is that the coupling part is able to at least partly shield of a gap which otherwise would remain present in between the limitation edge and the inserted pipe end. Thus accumulation of dirt there and further inside the groove-shaped space and around the gripping ring can be minimized. Furthermore the coupling part may help to smoothly guide the pipe end during insertion past by the limitation edge and/or past by the gripping ring, and keep it aligned.

In a preferred embodiment the one or more break segments can be formed by segments which lie alongside at least part of the limitation edge. Thus the one or more break segments may be prevented from prematurely breaking of, for example during transportation or insertion of the pipe end.

Preferably the check ring with its one or more break segments may be constructed such that when the check ring is coupled to the fitting, the one or more break segments extend at least partly outside the insertion space. This helps for the one or more break segments to be more easily removed when getting broken free by means of shear forces along the one or more separation parts from the coupling part by the pressing action.

In a first variant the one or more break segments can extend at least partly outside the insertion space when the check ring is coupled to the fitting. This makes it possible for the one or more break segments to come to lie at least partly substantially flat against an axial outer wall of the limitation edge. Furthermore this makes it possible for a suitable pressing tool to not only deform the press region from its non-compressed state towards its compressed state in order to have the gripping ring to grip the inserted pipe end, but to also have the pressing tool itself start exerting a radially inward directed pushing force onto outer edges of the one or more break segments during this pressing action in order to force the one or more break segments to break free by means of shear forces along the one or more separation parts from the coupling part by this pressing action.

In a second variant the one or more break segments can extend at least partly inside the insertion space and in particular lie at least partly in between the limitation edge and the inserted pipe end when the check ring is coupled to the fitting. This makes it possible for at least part of the one or more break segments to come to lie alongside a radial inner wall of the limitation edge. Furthermore this makes it possible for a suitable pressing tool to not only deform the press region from its non-compressed state towards its compressed state in order to have the gripping ring to grip the inserted pipe end, but to also have the limitation edge itself start exerting a radially inward directed pushing force onto outer edges of the one or more break segments during this pressing action in order to force the one or more break segments to break free by means of shear forces along the one or more separation parts from the coupling part by this pressing action.

For example the one or more break segments can be formed by arcuate semi-ring-shaped wall segments, in particular ones having an axial thickness of less than 2 mm.

It is also possible for the one or more break segments to comprise an open or closed ring-shaped break segment. The ring-shape advantageously helps the break segment to not jump away from the press fitting when it is broken free from the coupling part because it may remain to circumvent the inserted pipe end. In the case of an open ring-shaped break segment, it can subsequently simply be removed from the pipe end by a user, for example by flexing the ring-shaped break segment sufficiently far open or by breaking it into two or more pieces. In the case of a closed ring-shaped break segment, it can subsequently also be removed from the pipe end by a user, for example by breaking or shearing it into two or more pieces.

In a further embodiment the one or more break segments may have an outer diameter which is equal to or smaller than an outer diameter of the limitation edge and press wall part, and may have an inner diameter which is larger than an outer diameter of an inserted pipe end, in particular 2.5-5 mm larger than this outer diameter of the inserted pipe end. Thus the one or more break segments do not project radially outside the press wall part and limitation edge, and have enough radial play towards the pipe end such that they can be forced to break free when a suitable pressing tool exerts a sufficiently large radially inward directed pushing force onto the press wall part and one or more break segments during a pressing action.

The check ring can be made out of all kinds of materials. In a preferred embodiment at least the one or more separation parts of the check ring, but preferably also the rest of the check ring, are made out of a brittle material, in particular glass fibre reinforced plastic.

In another preferred embodiment at least the one or more separation parts of the check ring, but preferably also the rest of the check ring, are made out of a less brittle material, in particular an "unfilled" plastic material, like PBT, PA or POM, which have not gotten reinforced with glass fibres or the like. They make it possible to construct the check ring ductile enough for preventing it from prematurely breaking during assembly or transportation. The breaking of the one or more break segments from the coupling ring at the locations of the one or more separation parts, then can be realized by means of providing sharp angles and/or notches at the transitions between them. The "unfilled" plastic material gives the check ring good notching behaviour. Also the use of such "unfilled" plastic material for the check ring, makes it more reliable to manufacture, for example by means of injection moulding. Further it makes the check ring better resistant against grease, oil, and the like. For POM as choice of material it is noted that its injection moulding is less critical for humidity compared to PBT, whereas the brittleness of POM during use is less dependent on humidity than for PA. Furthermore it is noted that the glass transition temperature of POM lies at approximately −40° C., such that the check ring can be installed even at low temperatures.

In a further embodiment the coupling part of the check ring may comprise a substantially cylindrical inner guidance wall part for guiding and aligning the pipe end during insertion and pressing action. Because of this guidance wall part of the check ring at the side of the insert opening, it is now possible to more easily guide the pipe end past by the gripping ring during insertion and to keep the pipe end aligned during pressing.

First of all it is now more easy to insert the pipe end past by the gripping ring without running the risk of grasping teeth or the like to hinder the insertion of the pipe end. Secondly it is now more easy to keep the pipe end aligned during a pressing action. Even a pressing action which is not fully symmetrically distributed over the entire circumference of the press region, now does not immediately have to result in a pipe which runs oblique relative to a central axis of the socket into which it is inserted with its pipe end.

The guidance wall part of the check ring preferably is dimensioned such that an inserted pipe end can come to lie therein with only a minimum amount of circumferential play. In particular, the guidance wall part is given an inner diameter which is slightly larger than an outer diameter of the pipe end to be inserted therein, more in particular less than 1.2 mm larger. This helps to keep the pipe end aligned and does not stand in the way of the pipe end to be smoothly inserted into the insertion space of the socket.

In a preferred embodiment the press fitting is of the type which comprises an insert region which lies axially inwards from the press region (seen from the side of the insert opening), which is delimited by a substantially cylindrical insert wall part, and which also delimits the insertion space into which the pipe end is to be inserted. This insert region then preferably is dimensioned such that an inserted pipe end can come to lie abutting therein with only a minimum amount of circumferential play. In particular the insert wall part is given an inner diameter which is slightly larger than an outer diameter of the pipe end, more in particular less than 1.2 mm larger. The insert region and the check ring which respectively are positioned axially inward and axially outward of the press region, together are well able to automatically align the pipe end during insertion and keep it aligned during pressing. The gripping ring thus is able to perform its own dedicated function of gripping the pipe end and no longer has to play a role in keeping it aligned.

In a further preferred embodiment the press fitting is of the type which comprises not only a gripping ring inside the groove-shaped space but also a sealing ring. Owing to the invention, this sealing ring now is also well able to perform its own dedicated function of sealing and is less likely to get asymmetrically loaded during insertion, pressing and use.

In an even further preferred embodiment the press fitting is of the type which comprises a spacer ring inside the groove-shaped space. Owing to the invention, this spacer ring now is also well able to perform its own dedicated function of keeping the sealing ring and gripping ring separated from each other. Also it is now able to more uniformly keep on forming a blocking wall inside the groove-shaped space, such that a certain degree of closure/sealing now can be maintained under all circumstances by the spacer ring, even when the sealing ring may have been burned away. This makes the press fitting for example optimally usable in a gas installation or the like.

The gripping ring may be of all kinds of types as long as it is able to grip an inserted pipe end when pressed into the compressed state. Advantageously the gripping ring comprises a plurality of interspaced grasping teeth, wherein, in the non-compressed state, at least some of the grasping teeth are covered at their radial inwards side, that is to say towards the insertion space by the coupling part of the check ring. The covered grasping teeth then, during insertion of the pipe end, advantageously are no longer able to hinder the insertion of this pipe end in the non-compressed state. With this the check ring preferably is designed such that, during a pressing action, the grasping teeth are able to break through those parts of the check ring by which they are covered. In this way the covered grasping teeth are not hindered from gripping the pipe end in the compressed state.

In a further embodiment the gripping ring comprises an axial inward and outward row of the grasping teeth, wherein the check ring covers only the axial outward row towards the insertion space. In this way the check ring is able to smoothly have the pipe end pass at least the first half of the grasping teeth during insertion. Because of that the other half of the grasping teeth, that is to say from the axial inward row, are less likely to hinder the insertion, while both rows are still well able to immediately start gripping the pipe end during the pressing action.

In an even further embodiment the grasping teeth of the axial inward row are positioned axially slanted inward, whereas the grasping teeth of the axial outward row are positioned axially slanted outward. Thus the outwardly slanting ones of the grasping teeth advantageously get suitably covered by the check ring in the non-compressed state. Since the inwardly slanting ones extend slanting in the insertion direction of the pipe end, it is no problem if they are not covered by the check ring. They may even help to keep the pipe end aligned during insertion together with the check ring itself.

The coupling part of the check ring can be connected to the socket at the side of the insert opening in various manners, for example by means of a glue, weld or the like. In a variant the coupling part of the check ring for example can cooperate with complementary coupling means which delimit the groove-shaped space and/or which form part of the limitation edge. The coupling part makes it very easy to quickly connect the check ring to the socket, for example by simply clicking it thereto. In a preferred embodiment the coupling part is designed to, in the non-compressed state, couple with the gripping ring, in particular with a snap fit.

In the earlier mentioned variant with the two rows of grasping teeth, the coupling part then may be designed to extend into a space which is left free in between those two rows. This has the advantage that if during a pressing action the grasping teeth of the axially outward row break through the coupling part of the check ring, that then this broken off coupling part remains locked up between the two rows of grasping teeth. Thus the possibly sharp edged broken off coupling part(s) cannot come near the vulnerable sealing ring.

In particular the coupling part of the check ring can furthermore be equipped with a gap filling part which extends outside the groove shaped space and is designed to, in the compressed state, substantially fill up or substantially shield of a gap between the inserted pipe end and the limitation edge. Thus it can be entirely prevented that dirt or the like can enter the pressing region. In particular the gap filling part then can be dimensioned to, in the non-compressed state, lie radially interspaced from the limitation edge, and, in the compressed state, lie radially substantially against the limitation edge, in particular while being clamped by it. This clamping can become important when used in combination with the variant in which parts of the coupling part get broken off by the gripping ring during a pressing action. In that case the clamping function of the gap filling part then is able to take over the function of keeping the check ring in place during use of the press fitting.

Further preferred embodiments of the invention are described herein.

The invention also relates to an assembly of the inventive press fitting and an inserted pipe end, as well as to a method for pressing the inventive press fitting.

BRIEF DESCRIPTION OF THE DRAWINGS

The invention shall be explained in more detail with reference to the accompanying drawings, in which:

FIGS. 3a-g show a perspective, front, side, cross-sectional, rear and enlarged partial views of the check ring of FIGS. 1 and 2;

FIG. 4.1 is a view according to FIG. 2 during a first stage of a pressing action;

FIG. 4.1a is an enlarged partial view of FIG. 4.1;

FIG. 4.2 is a view according to FIG. 2 during a second stage of a pressing action;

FIG. 4.2a is an enlarged partial view of FIG. 4.2;

FIGS. 15a-b show a further variant of the check ring of FIG. 8-14 with slit sections;

DETAILED DESCRIPTION OF THE INVENTION

Figure 1:
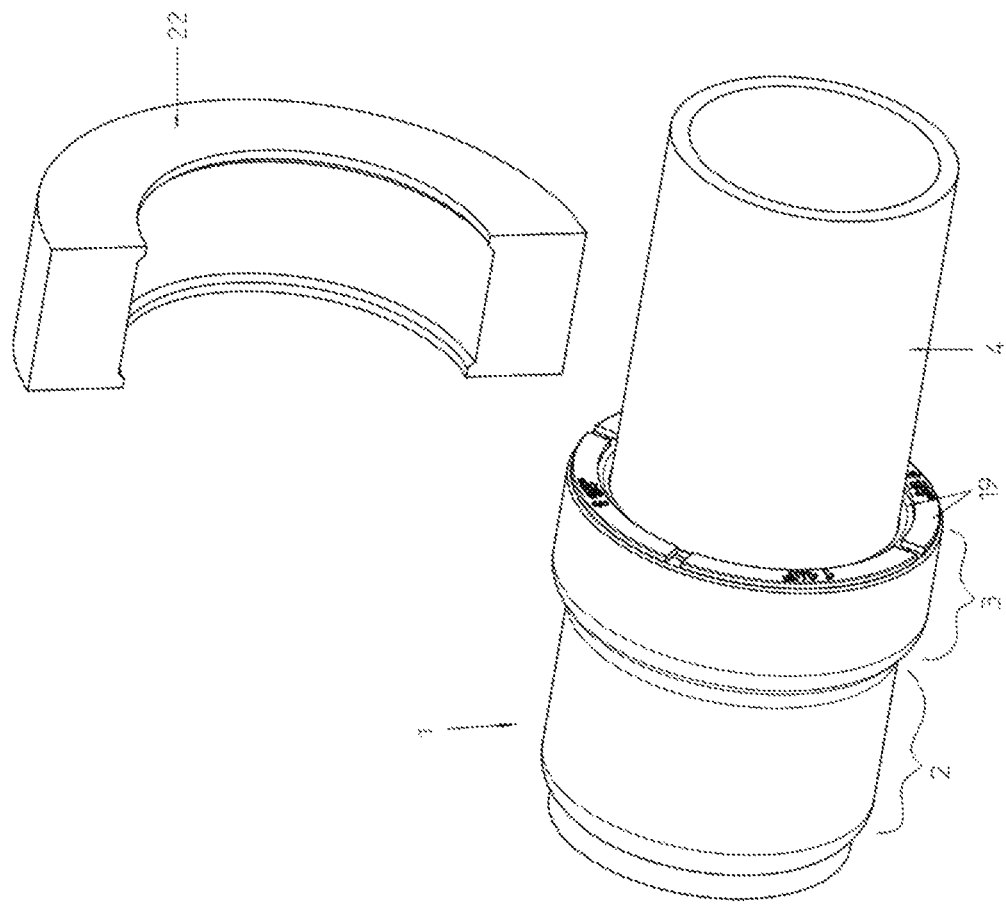
FIG. 1 is a schematic perspective view of a press fitting according to the invention in a non-compressed state having a pipe end inserted therein and part of a pressing tool distanced from the fitting.
Figure 1A:
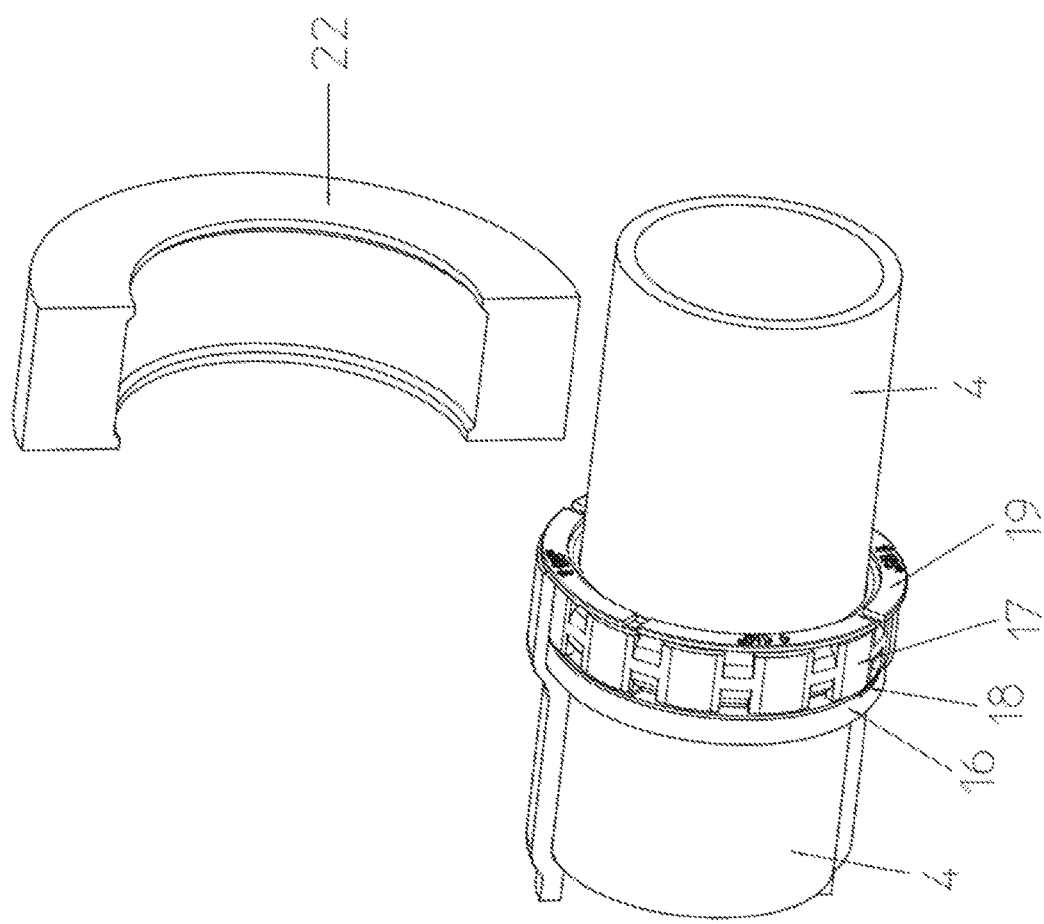
FIG. 1a is a partially cut-open view of FIG. 1.

The press fitting comprises a steel socket which has been given the reference numeral 1 in FIG. 1-7. The socket 1 comprises an insert region 2 and a press region 3. A pipe end 4 has been inserted into an insertion space of the insert and press regions 2, 3. The insert region 2 is delimited by a substantially cylindrical insert wall part 7 which has an inner diameter Dir which is slightly larger than an outer diameter Dpe of the pipe end 4, such that the pipe end 4 could be easily inserted therein until it came to abut against an abutment edge 8.

The press region 3 is formed by a substantially cylindrical press wall part 10. This press wall part 10 forms a widened section relative to the insert wall part 7. Inside the press wall part 10, a groove-shaped space 11 is present. See in particular FIG. 2. The groove-shaped space 11 has been manufactured in the press wall part 10 by means of a machining operation in which metal has been removed from the inside of the press wall part 10. With this the press wall part 10 before machining had a substantially same wall thickness as the insert wall part 7, but after machining has a reduced wall thickness compared thereto. The machining operation has been performed over almost the entire length of the press region 3. Only at the free end of the press region 3 the machining operation has not taken place such that a radially inwardly projecting edge 12 is formed there. This edge 12 delimits the groove-shaped space 11 towards a free end of the socket 1. At an axial inward side the groove-shaped space 11 is delimited by a transitional wall part 14 which extends between the insert wall part 7 and the press wall part 10.

In the groove-shaped space 11 a sealing ring 16 and a gripping ring 17 are placed. A spacer ring 18 is placed in between the sealing ring 16 and the gripping ring 17. The spacer ring 18 is formed by a helical wound split spacer ring with partly sideways overlapping windings. Furthermore a check ring 19 has been clicked onto the gripping ring 17.

The sealing ring 16 here is formed by an O-ring with two radially inwardly projecting circumferential ridges 16'. Between those ridges 16' a concave hollow is present. The ridges 16' give the sealing ring 16 sideways stability against rolling during assembly. Furthermore they make it possible for the sealing ring 16 to properly seal against irregularities which might be present on the inserted pipe end 4. Finally they give the sealing ring 16 more volume compared to a conventional O-ring and thus more stability and sealing capacities.

The gripping ring 17 is equipped with two rows of pairs of grasping teeth 17'. Each pair has oppositely slanting grasping teeth 17'. The grasping teeth are slanted away from each other. This has the advantage that the most important row of teeth 17', that is to say the one which projects slanted inwards and thus needs to prevent that the pipe end 4 can be pulled out of the socket 1, lies at a greater distance of the free outer end of the socket 1 compared to the other row of teeth 17', that is to say where the socket 1 is stronger.

Figure 2:
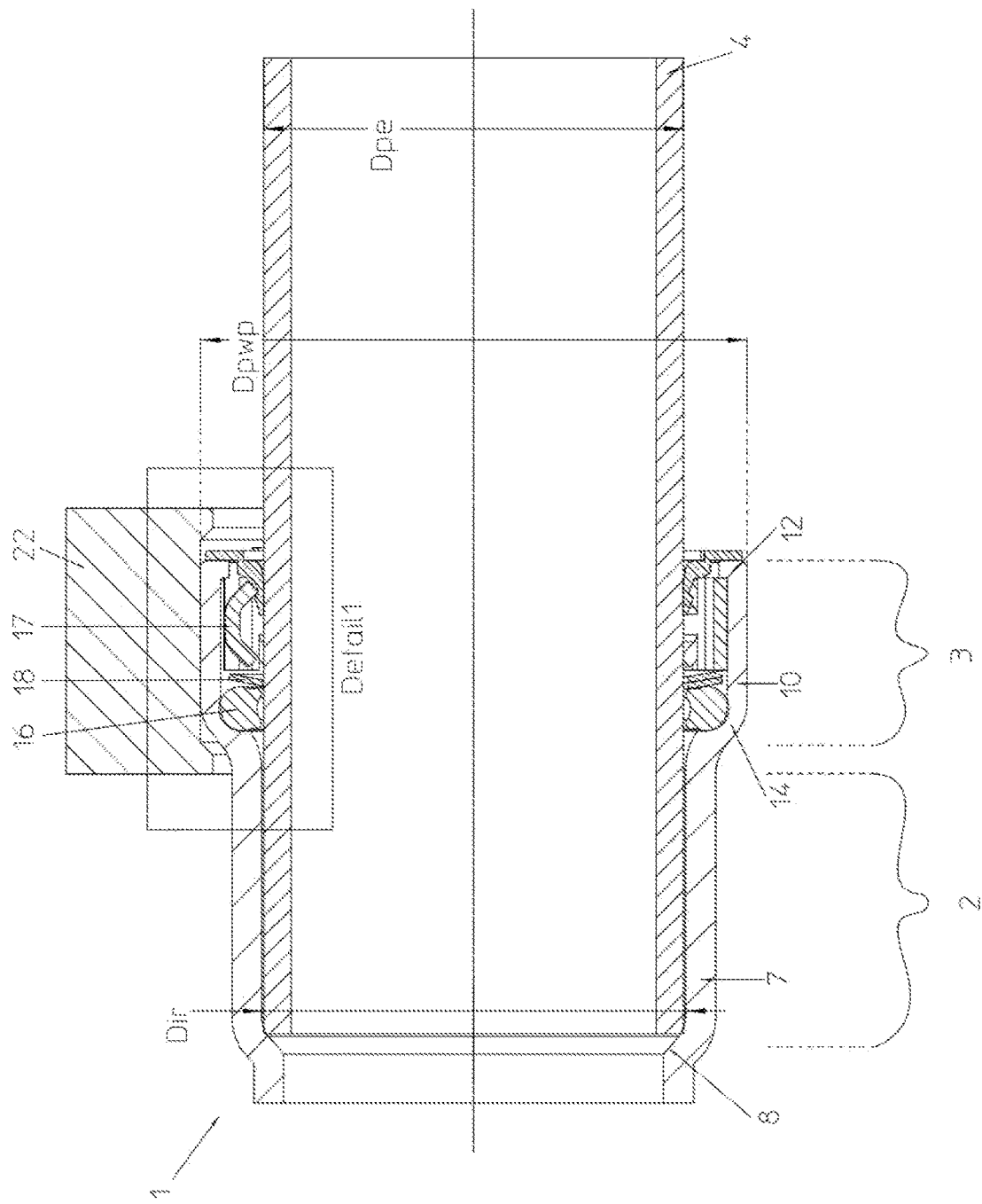
FIG. 2 is a sectional view of FIG. 1 with the part of the pressing tool ready for pressing.
Figure 2A:
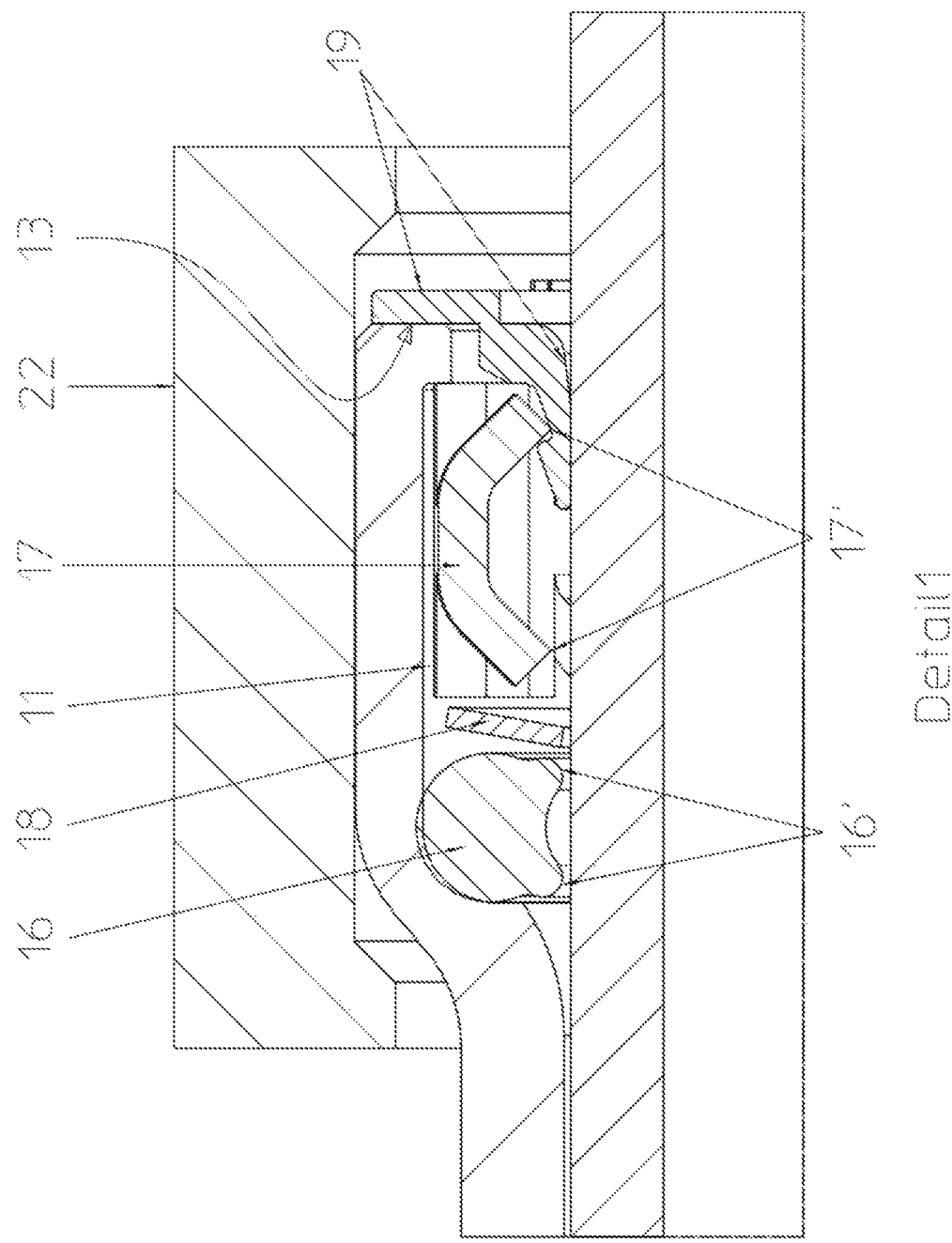
FIG. 2a is an enlarged partial view of FIG. 2.
Figure 3A:
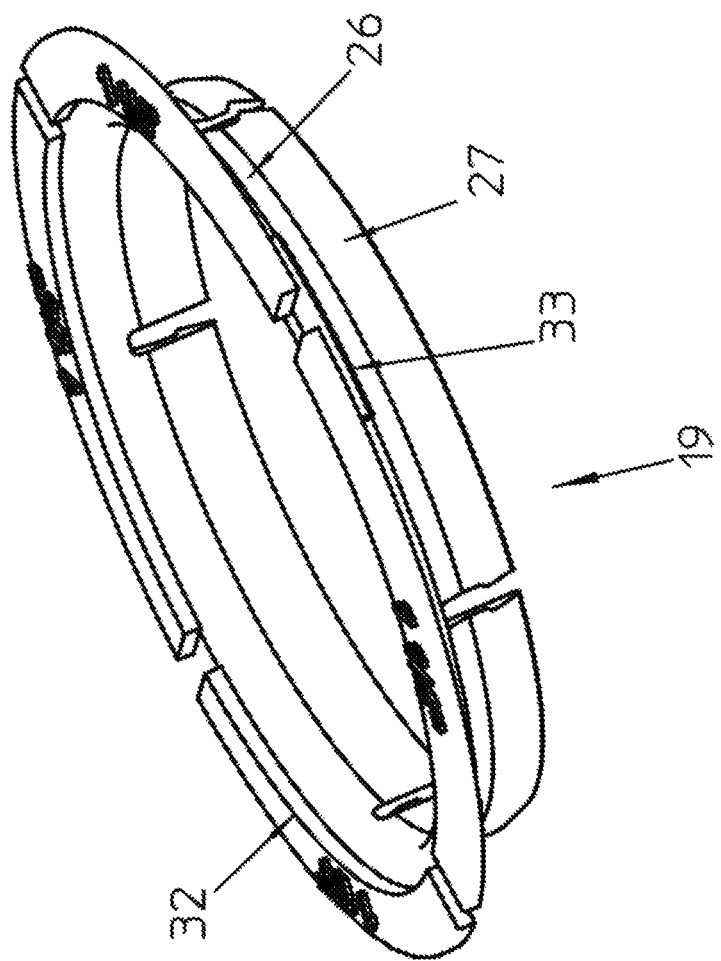

The press fitting with the pipe end 4 inserted therein is shown in FIG. 1-2 in its non-compressed state. In this non-compressed state, inner diameters of the sealing ring 16, gripping ring 17 and a spacer ring 18 are slightly larger than an outer diameter Dpe of the pipe end 4, such that the pipe end 4 could be easily inserted therein until it came to abut against the abutment edge 8. The split spacer ring 18 in this non-compressed state lies with its outer circumferential edge parts free from the press wall part 10. It may however also lie somewhat pre-biased against it.

According to the invention a check ring 19 is provided. This check ring 19 comprises a cylindrical inner guidance wall part 26 which has an inner diameter Dar which is slightly larger than the outer diameter Dpe of the pipe end 4.

The guidance wall part 26 forms part of a coupling part 27 of the check ring 19, which coupling part 27 grips with a thickened snap edge 28 behind the axial outward row of the grasping teeth 17'. The coupling part 27, in the non-compressed state as shown in FIG. 2, covers the axial outward row of the grasping teeth 17' towards the pipe end 4.

At its outer side the guidance wall part 26 of the coupling part 27 of the check ring 19 forms a gap filling part 30, which, in the non-compressed state as shown in FIG. 2, lies around the inserted pipe end 4 directly underneath but radially interspaced from the limitation edge 12.

A plurality of arcuate semi-ring-shaped break segments 32 are connected to the gap filling part 30 by means of arcuate semi-ring-shaped separation parts 33. The separation parts 33 form weakened wall parts which integrally connect the break segments 32 with merely their outer ends to the gap filling part 30.

The break segments 32 extend alongside an axial outer sidewall 13 of the limitation edge 12 and have an outer diameter Dbso which is smaller than an outer diameter Dpwp of the press wall part 10 and which have an inner diameter Dbsi which is larger than the outer diameter Dpe of the pipe end 4.

During insertion of the pipe end 4, the guidance wall part 26 as well as the rest of the coupling part 27 helps the pipe end 4 to smoothly pass the rows of grasping teeth 17'. As soon as the pipe end 4 not only has come to lie inside the press region 3 but also has come to lie inside the insert region 2, the pipe end 4 is kept properly aligned coaxial with the socket 1 by the relative snug fit with the insert wall part 7 and the guidance wall part 26.

The press region 3 of the press fitting of FIG. 1-2 can now be compressed from the non-compressed state into the compressed state by means of a press tool 22. This press tool 22, of which only a part has been schematically shown in FIGS. 1 and 2, is designed to exert a radially inward directed pressing action on the outer side of the press wall part 10. Because of this the press wall part 10 starts to deform and gets radially compressed to a smaller diameter.

A first stage hereof is shown in FIG. 4.1. Here the press tool 22 has compressed the press wall part 10 to such an extent that the tool 22 also has come to lie against radial outer edges of the break segments 32. The gripping ring 17 then already has started to grip into the pipe end 4 and with this has cut of the snap edges 28 of the coupling part 27 from the guidance wall part 26 and gap filling part 30.

A second stage hereof is shown in FIG. 4.2. Here the press tool 22 has compressed the press wall part 10 to such an extent that the tool 22 has forced the break segments 32 to break free from the guidance wall part 26 and gap filling part 30.

Figure 5:
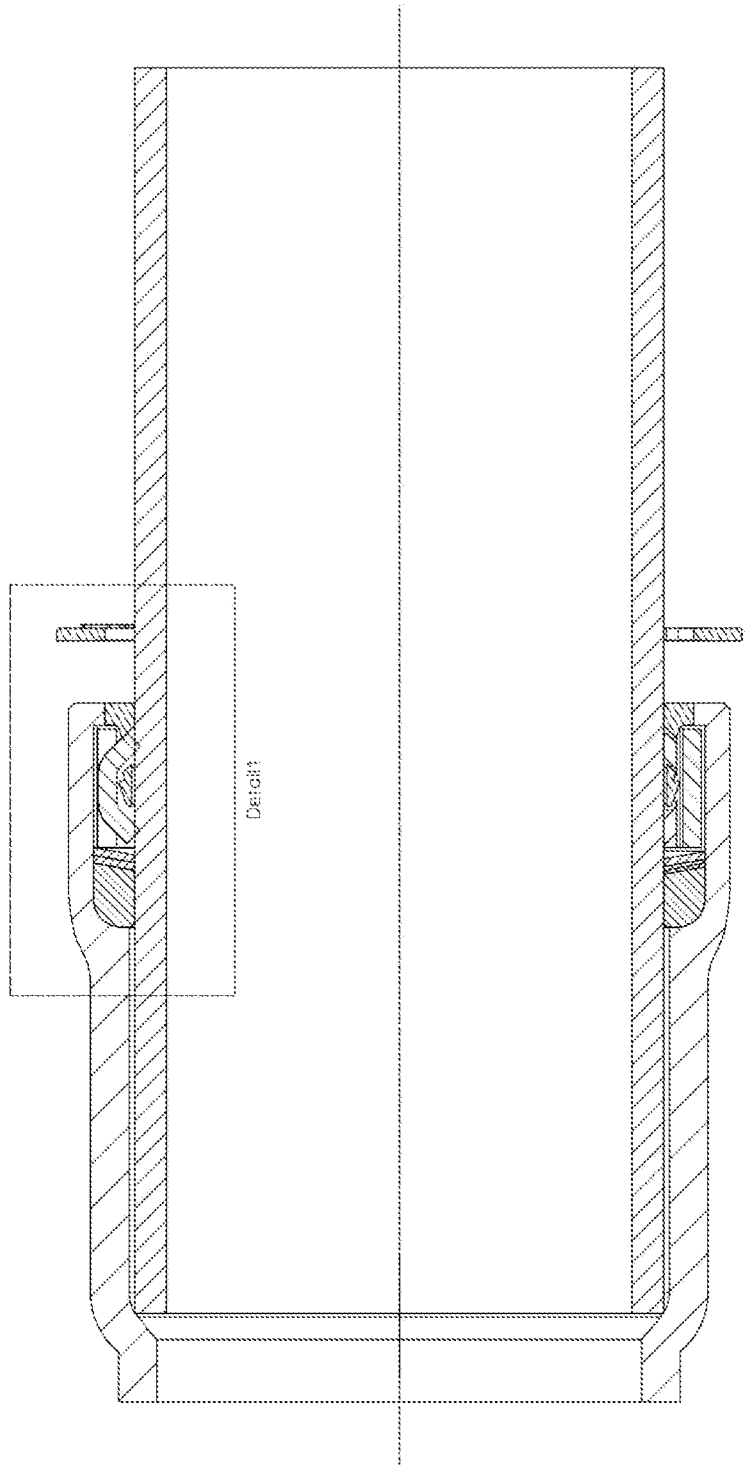
FIG. 5 is a view according to FIG. 2 in a compressed state.
Figure 5A:
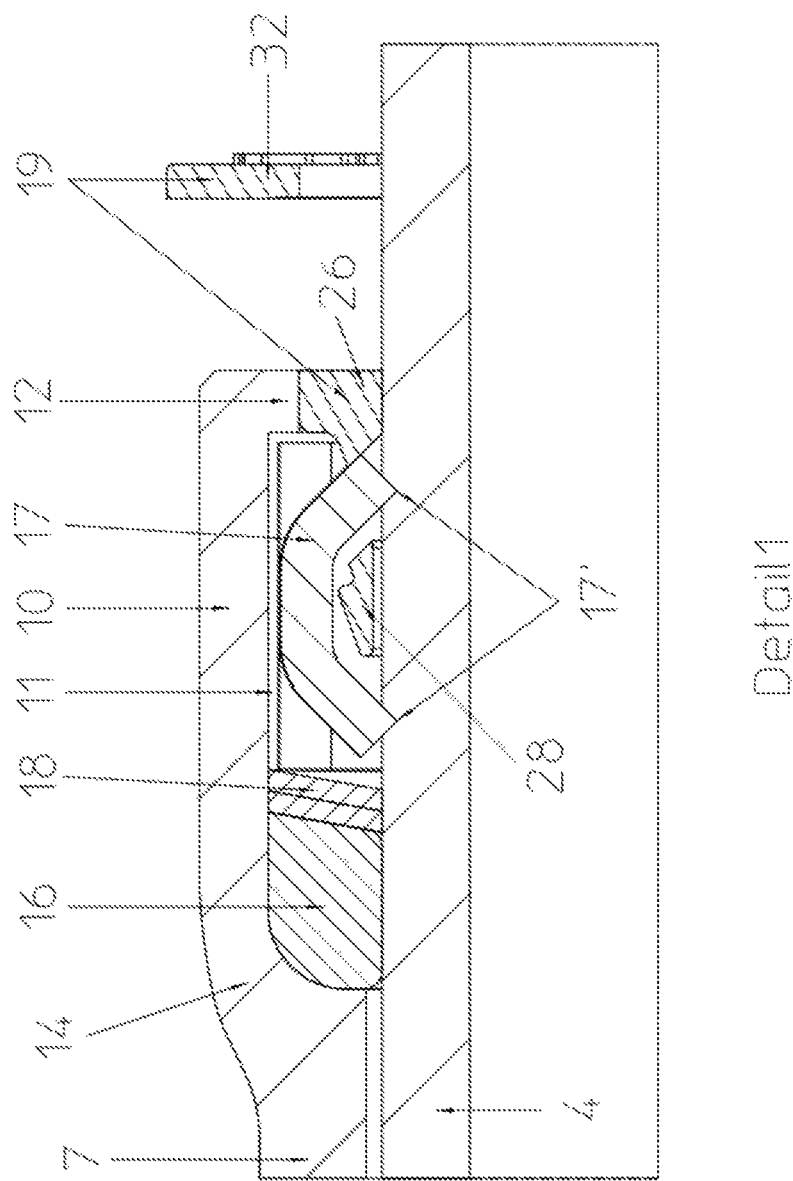
FIG. 5a is an enlarged partial view of FIG. 5.

Subsequently the tool 22 can be removed. In the compressed state as shown in FIG. 5, which then has been achieved, the gripping ring 17 has gotten to firmly grip with its grasping teeth 17' into the pipe end 4. The sealing ring 16 has gotten deformed such that it substantially fills up the entire space between the pipe end 4, the transitional wall part 14, the press wall part 10 and the spacer ring 18.

Furthermore as follows from the above described stages, in the compressed state, the check ring 19 also has went through some important changes.

First of all the coupling part 27 has gotten cut through by the grasping teeth 17'. The broken off snap edge 28 of the coupling part 27 has come to lie locked up in between the two rows of the grasping teeth 17'.

Secondly the gap filling part 30, in this compressed state, has gotten to fully fill up and thus shield of the initial gap between the inserted pipe end 4 and the limitation edge 12. The gap filling part 30 now has gotten forcedly clamped in between the radially inwardly compressed limitation edge 12 and the pipe end 4.

Thirdly the break segments 32 have been forced to break free along the separation parts 33 from the rest of the check ring 19. This was caused by the press tool 22 moving gradually radially inward during the pressing action. Thus the press tool 22 came to abut against the break segments 32 and started to push them radially inwards. Because of the separation parts 33, and preferably the entire check ring 19, being made out of a brittle material, in particular glass fibre reinforced plastic, this resulted in the break segments 32 breaking of during the pressing and thus indicating that the pressing had taken place.

Figure 6:
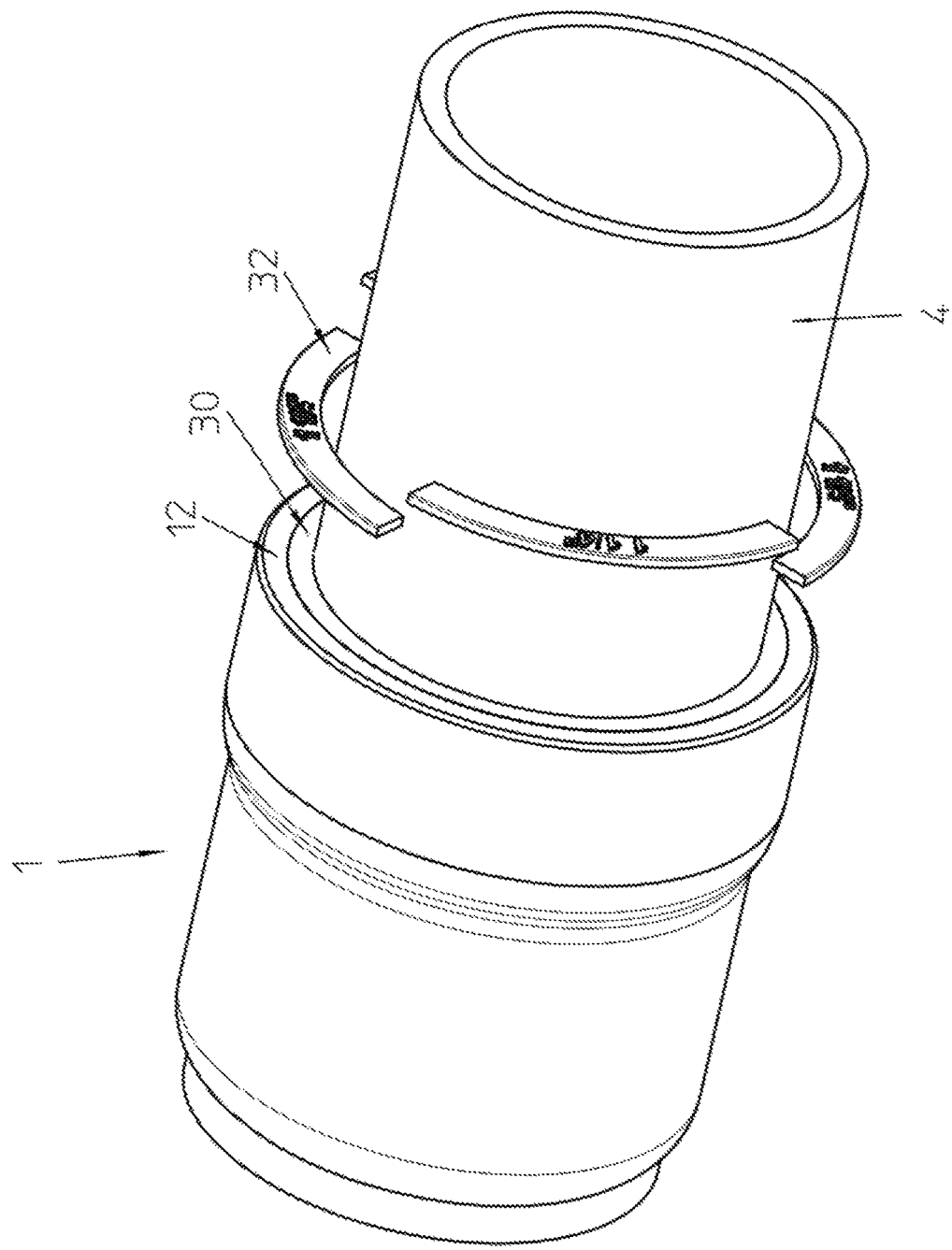
FIG. 6 is a view according to FIG. 1 in the compressed state.
Figure 7:
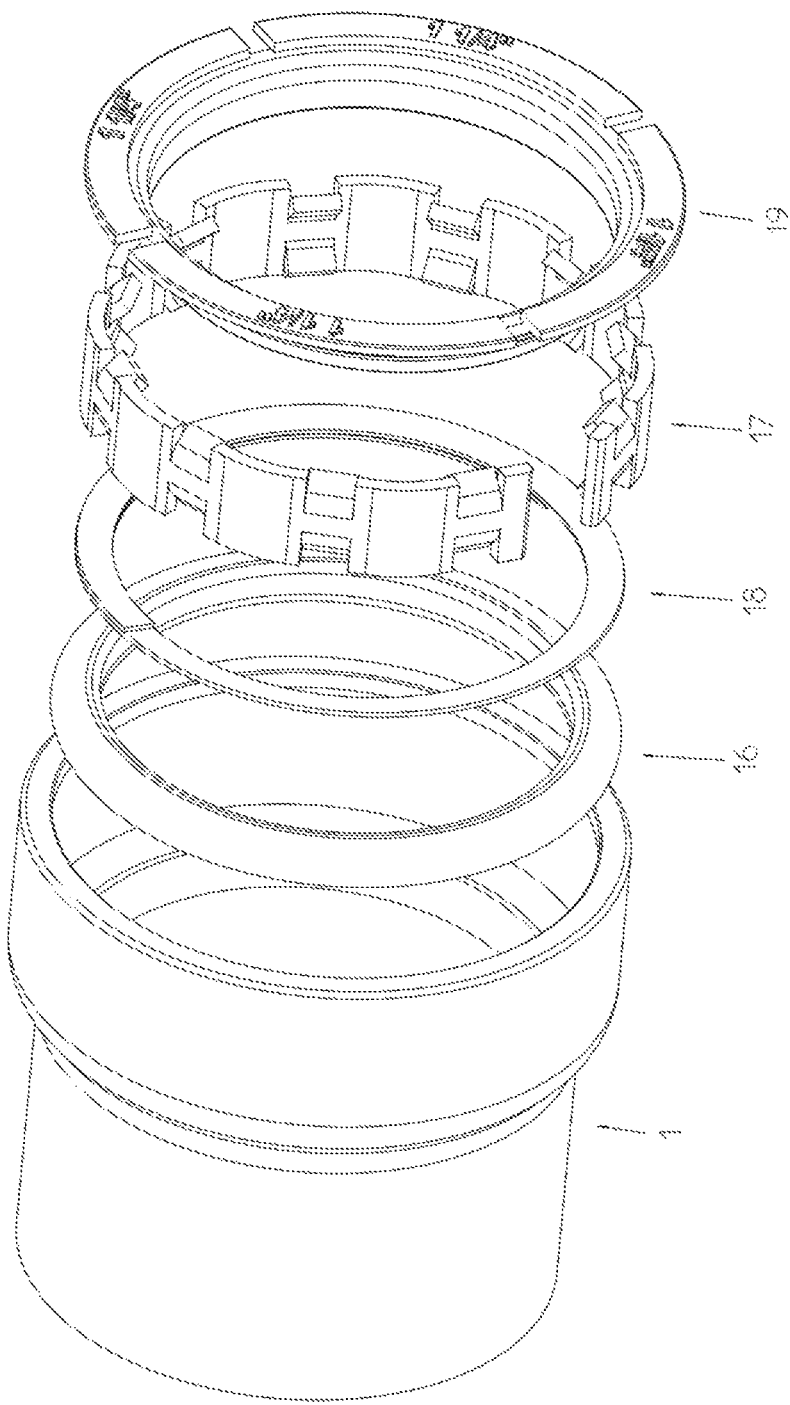
FIG. 7 is an exploded view of the press fitting.
Figure 8:
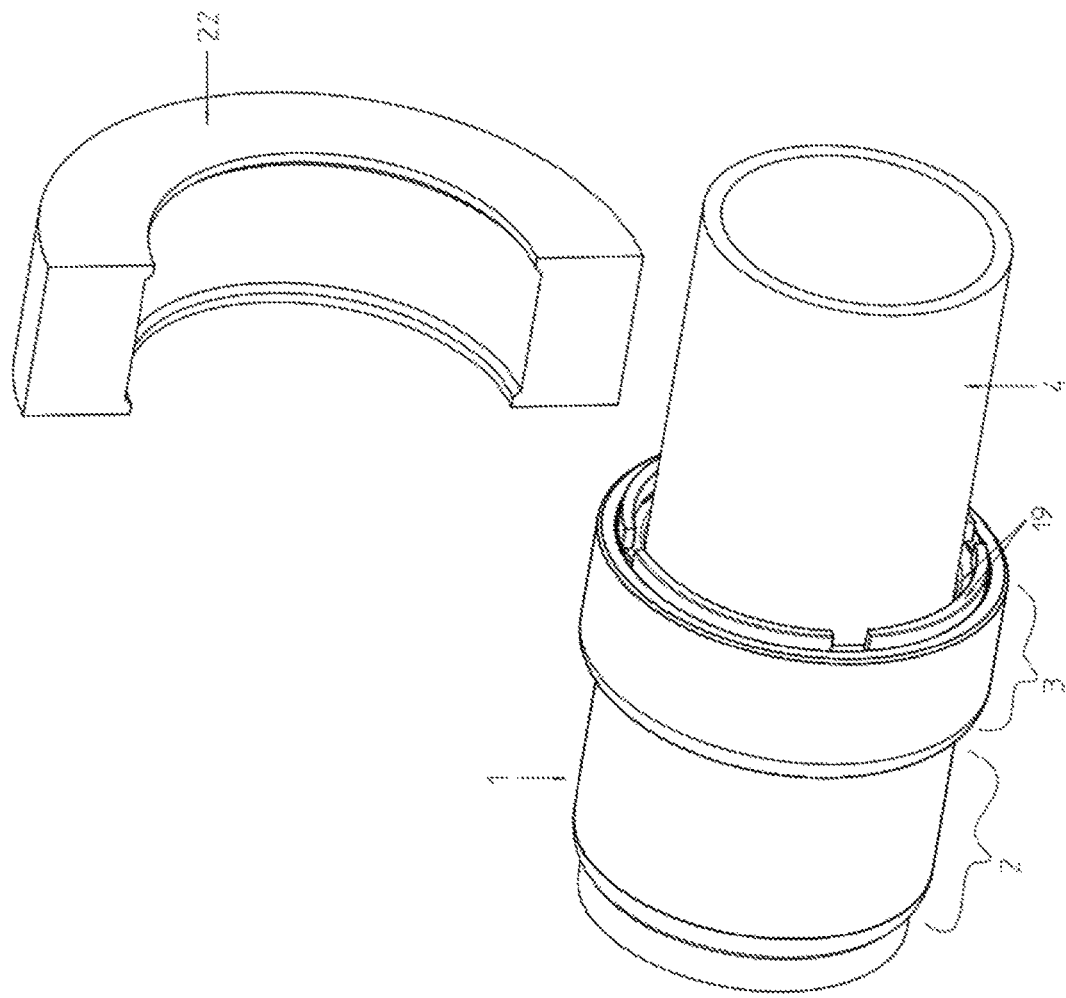
FIGS. 8-14 show views corresponding to FIG. 1-7 of a variant embodiment of the press fitting according to the invention.
Figure 8A:
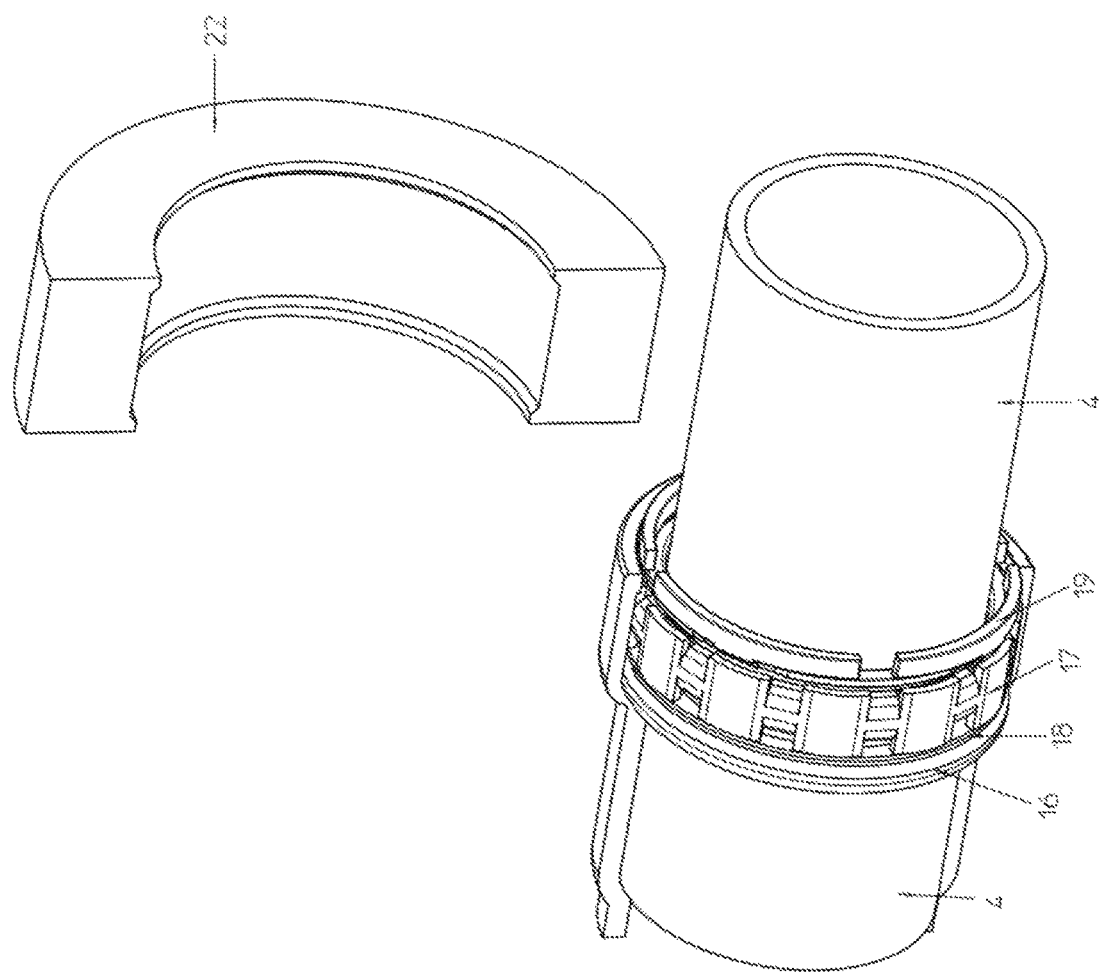
Figure 9:
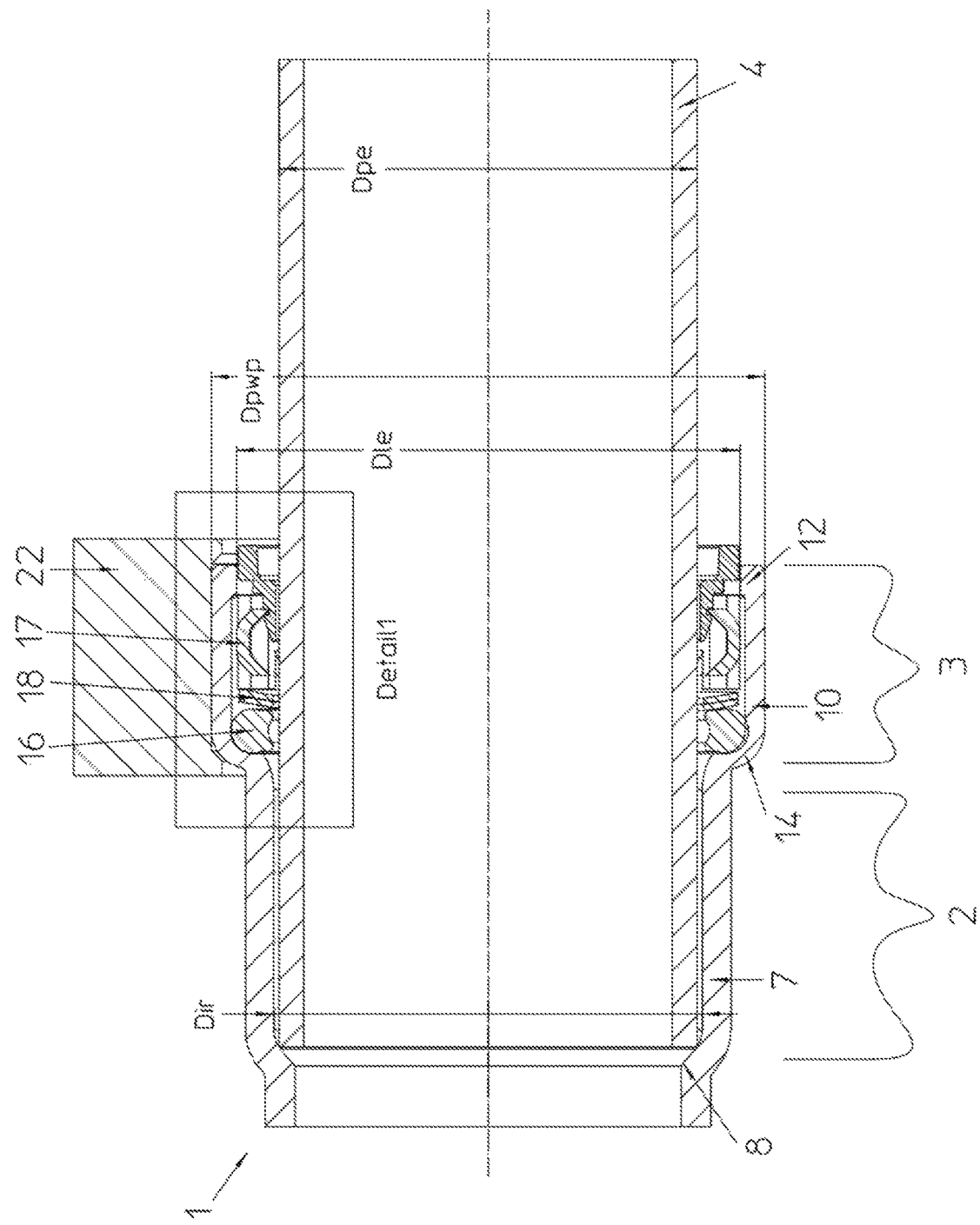
Figure 9A:
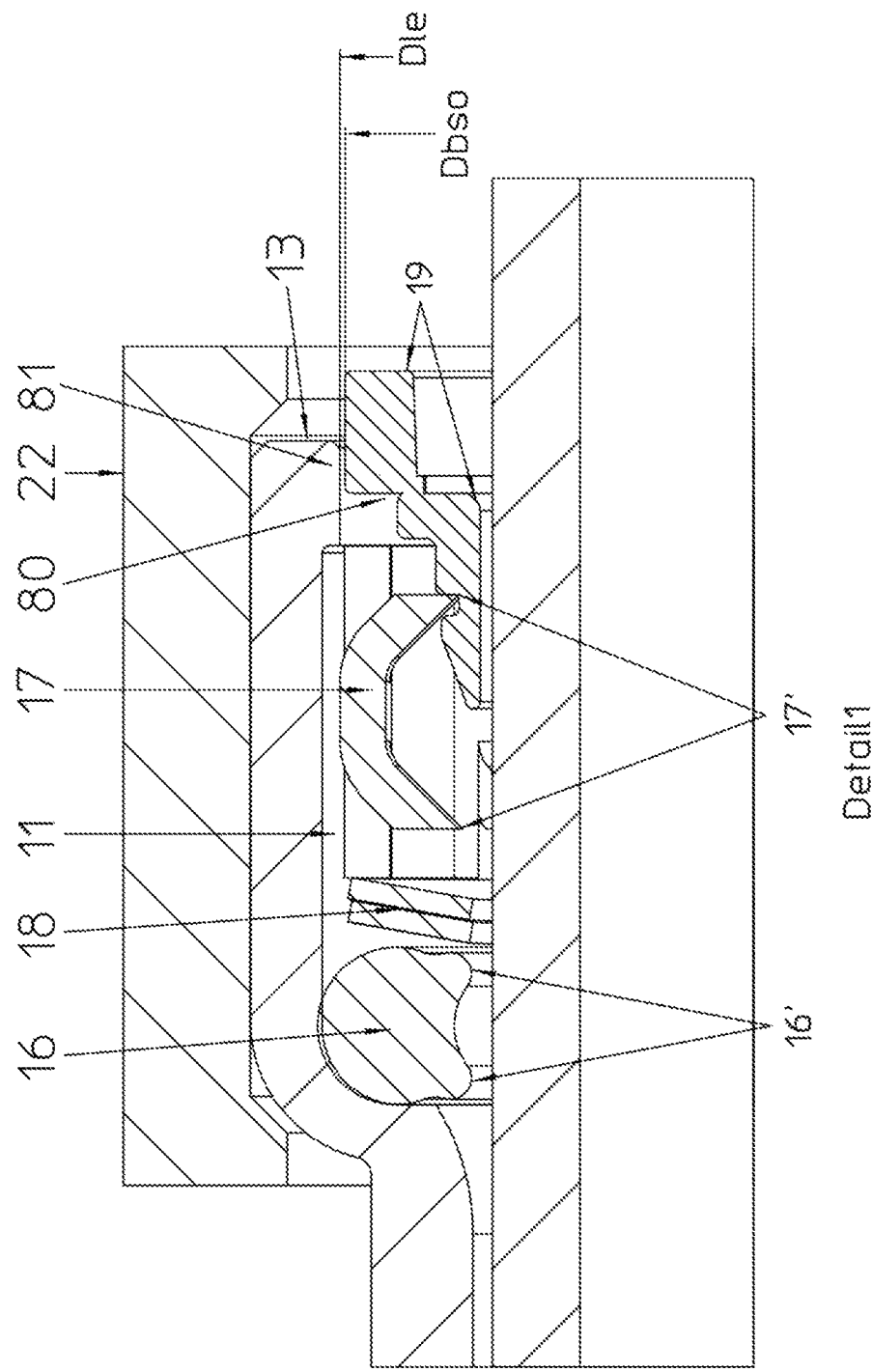
Figure 10A:
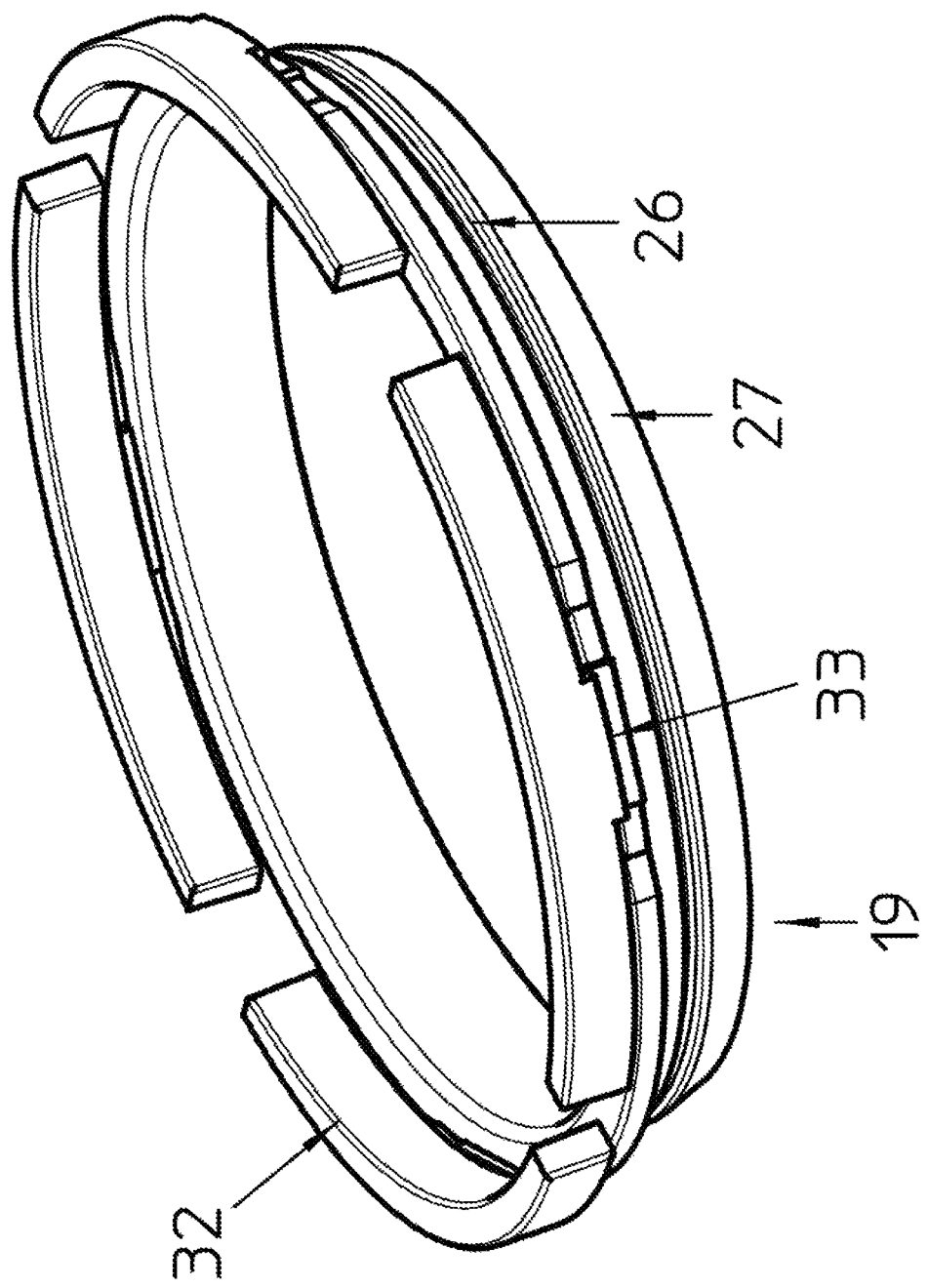
Figure 11:
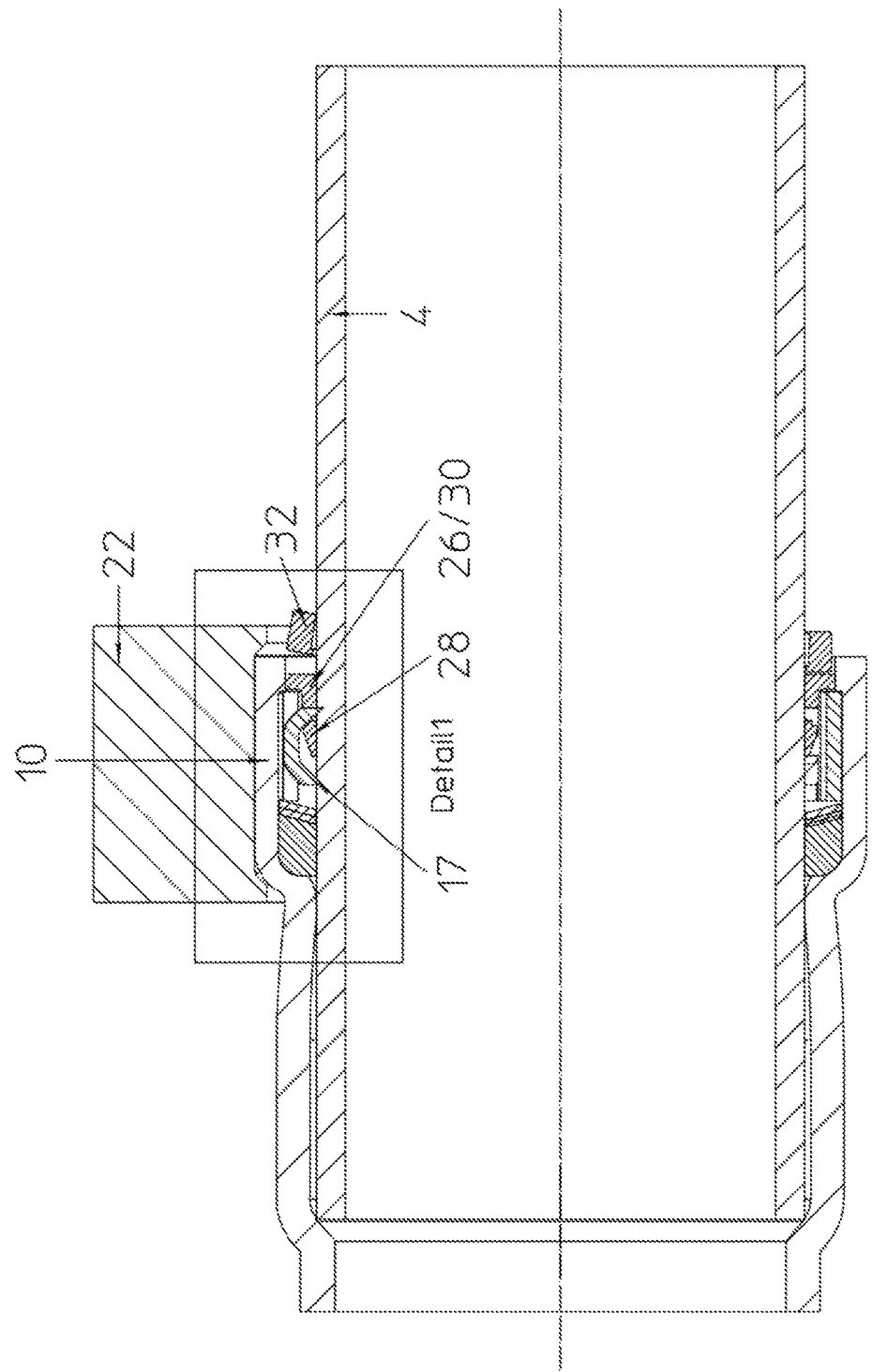
Figure 11A:
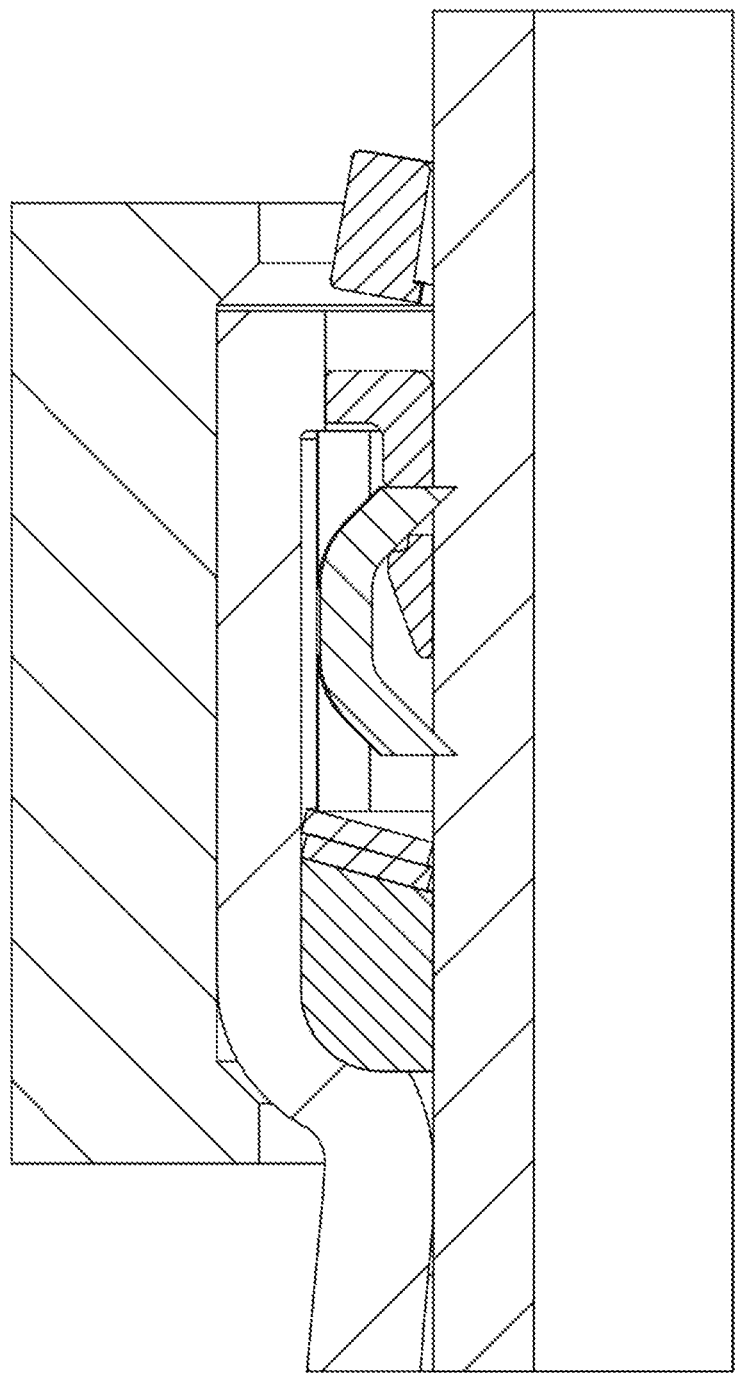
Figure 12:
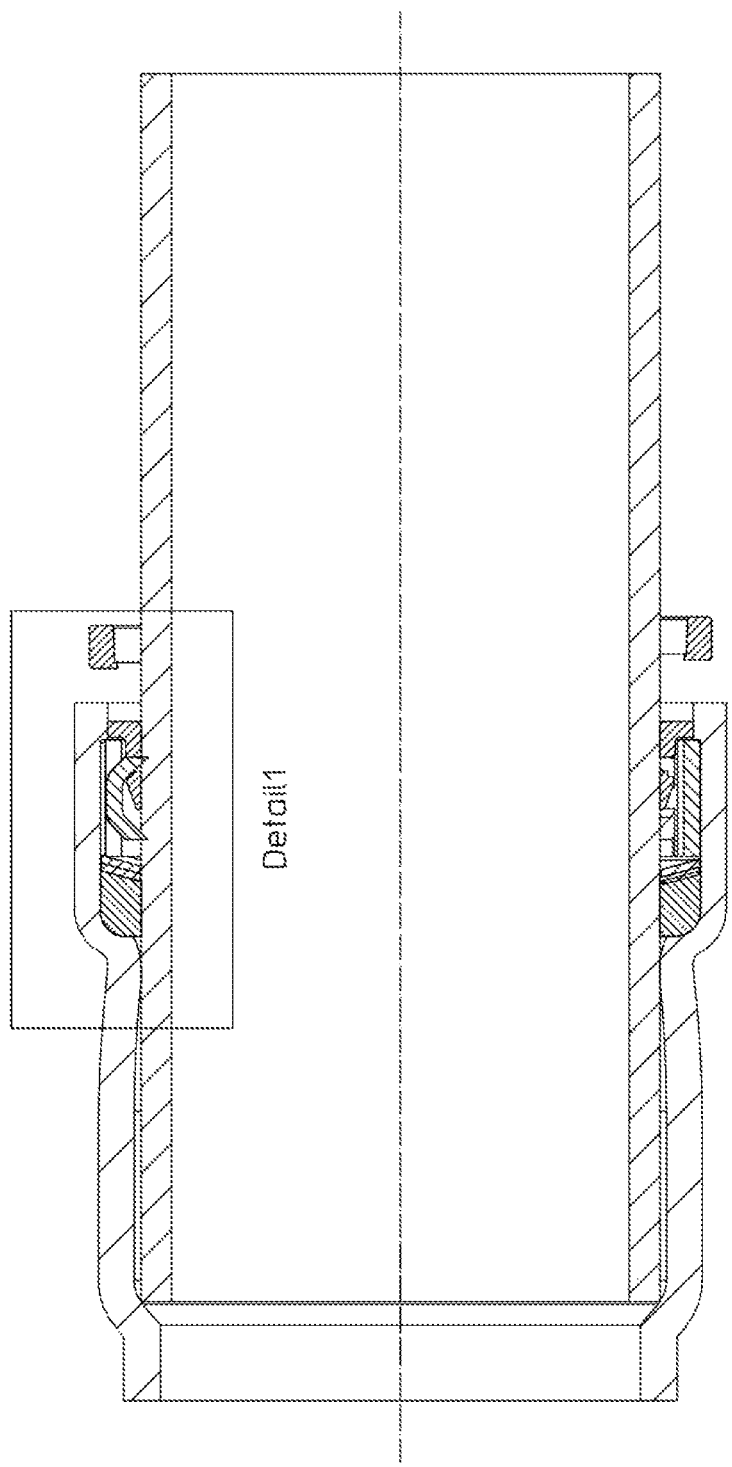
Figure 12A:
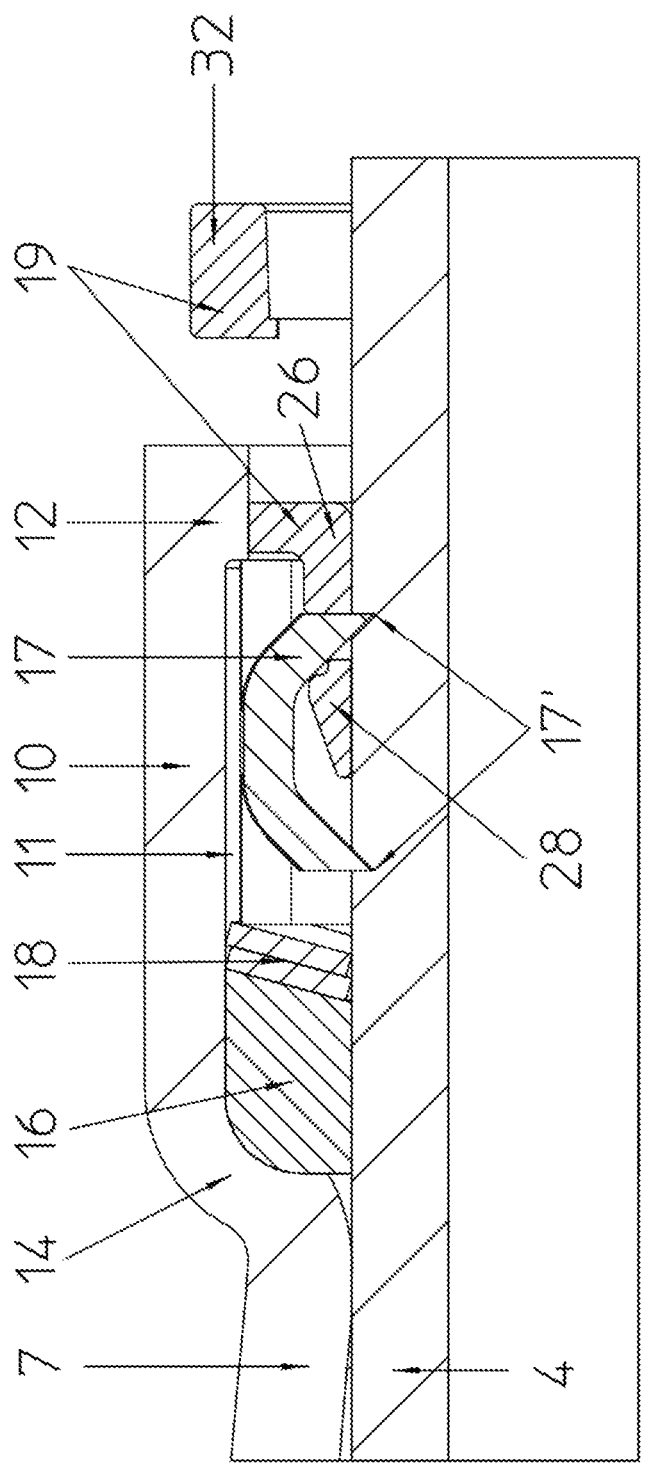
Figure 13:
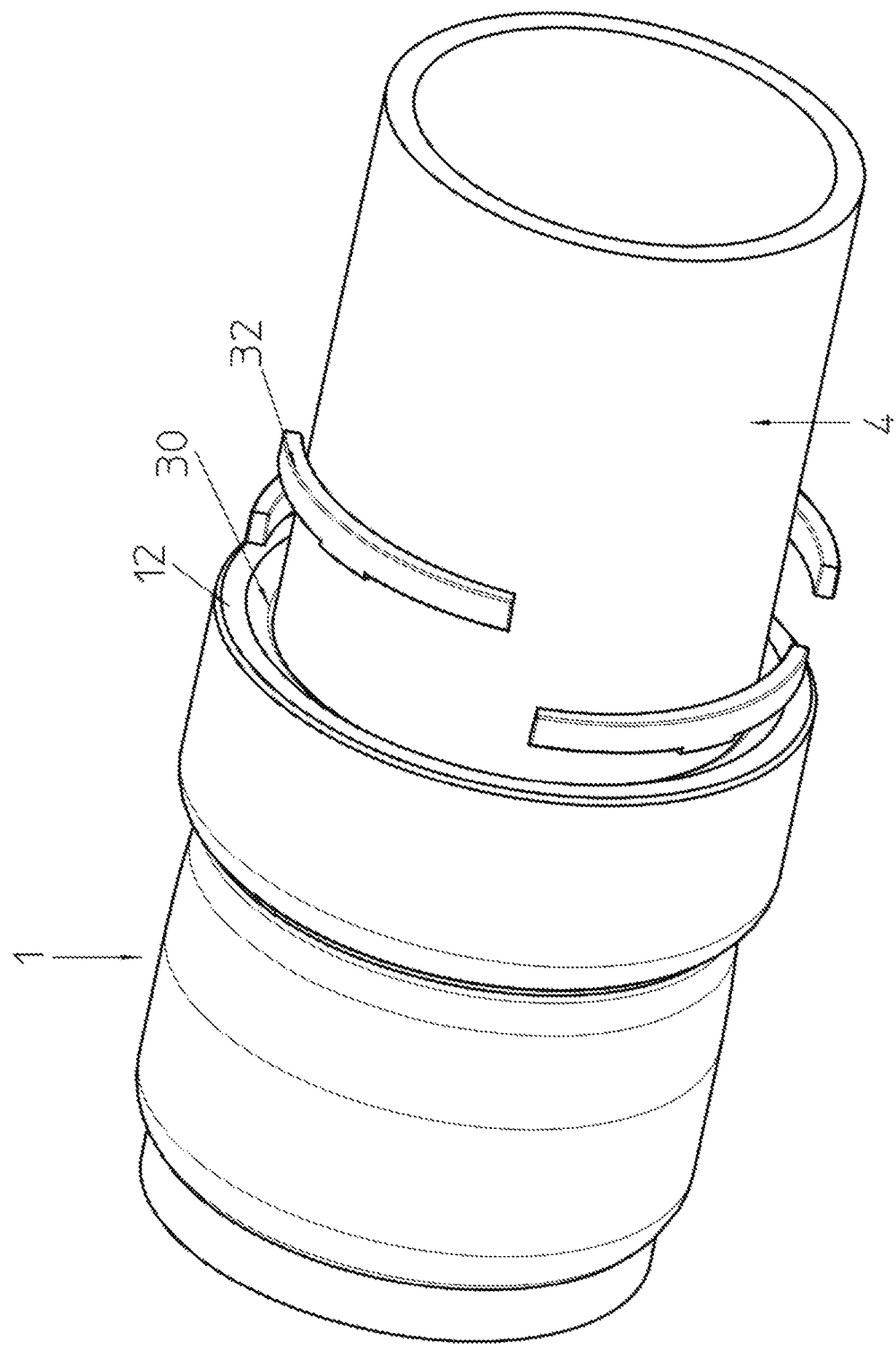
Figure 14:
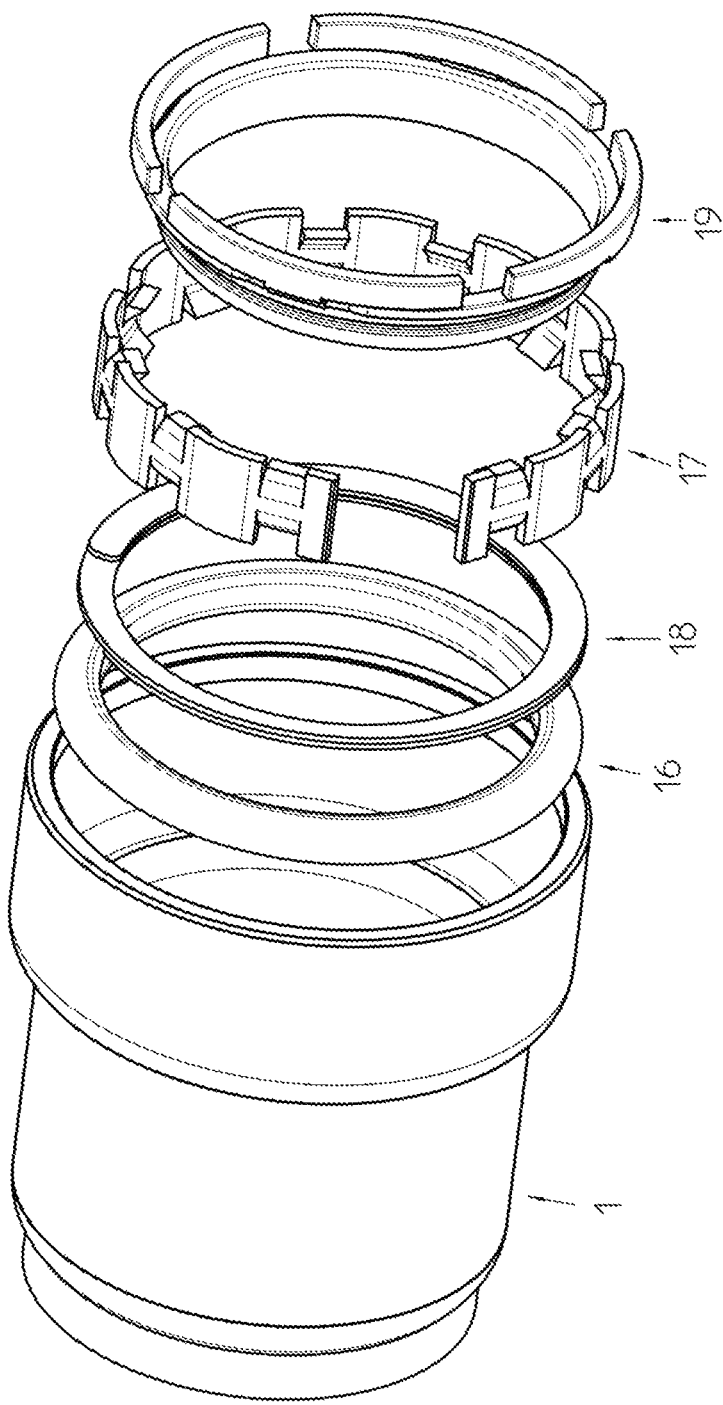

In the compressed state the inserted pipe end 4 is gripped by the gripping ring 17 and is kept sealed by the sealing ring. It is possible to provide the check ring 19 with some kind of distinctive colouring or marking such that an installer after pressing not only is able to check that the pressing has taken place but also if the correct type of press fitting complementary to the aimed purpose has been used. Owing to the invention this checking is even possible when the break segments 32 have been removed, because as can be seen in FIG. 6, the gap filling part 30 remains clearly visible from the outside of the socket 1 in the compressed state.

In FIGS. 8-14 a variant embodiment is shown in which same or similar parts have been given the same reference numerals. In this embodiment another type of check ring 19 is used.

This check ring 19 largely resembles the one of FIGS. 1-7 and for example still comprises a cylindrical inner guidance wall part 26 with an inner diameter Dar that is slightly larger than the outer diameter Dpe of the pipe end 4. Also the guidance wall part 26 still forms part of the coupling part 27 that grips with a thickened snap edge 28 behind the axial outward teeth 17' of the gripping ring while, in the non-compressed state, covering those axial outward teeth 17'. At its outer side the guidance wall part 26 still forms a gap filling part 30, which, in the non-compressed state, lies around the inserted pipe end 4 directly underneath but radially interspaced from the limitation edge 12. The check ring 19 also still comprises a plurality of arcuate semi-ring-shaped break segments 32 that are connected to the gap filling part 30 by means of arcuate semi-ring-shaped separation parts 33. The separation parts 33 again form weakened wall parts. A difference is that this time only one separation part 33 per break segment 32 is provided. Each separation part 33 here integrally connects its break segment 32 with merely its center part to the gap filling part 30. By only connecting the center parts of the break segments 32 to the rest of the check ring 19, it becomes somewhat easier for the pressing action to break them free. A sharp edged notch 80 is provided at the radially outer transition of each separation part 33 with its break segment 32, in order to further enlighten the breaking free of the break segments 32 during the pressing action.

In contrast to the embodiment of FIG. 1-7, the break segments 32 now no longer extend alongside the axial outer sidewall 13 of the limitation edge 12, but extend partly alongside a radial inner wall 81 of the limitation edge 12 and partly past by the limitation edge 12 in the axial direction to outside the socket 1. The break segments 32 here have an outer diameter Dbso which is slightly smaller than an inner diameter Dle of a radial inner wall 81 of the limitation edge 12. In particular, the outer diameter Dbso here is about 0.3 mm smaller than the inner diameter Dle. Furthermore the break segments 32, like in the FIG. 1-7 embodiment, have an inner diameter Dbsi which is larger than the outer diameter Dpe of the pipe end 4.

After insertion of the pipe end 4, the press region 3 can be compressed from the non-compressed state into the compressed state by means of a similar type of press tool 22. The press tool 22 then exerts its radially inward directed pressing action on the outer side of the press wall part 10, causing the press wall part 10, including the limitation edge 12 to deform and get radially compressed to a smaller diameter. During this pressing action, the limitation edge 12 comes to lie against radial outer edges of the break segments 32 and forces them to break free by shearing action starting at the notches 80. At the same time the gripping ring 17 gets forced to grip into the pipe end 4.

After the compressed state has been obtained, the pressing tool can be removed. Like in the FIG. 1-7 embodiment, the gap filling part 30, in this compressed state, has again gotten to substantially fill up and thus shield of the initial gap between the inserted pipe end 4 and the limitation edge 12, by getting clamped in between the radially inwardly compressed limitation edge 12 and the pipe end 4.

It is noted that the limitation edge 12 has been constructed somewhat wider in the axial direction compared to the FIG. 1-7 embodiment. This gives it enough width to on the one hand cause its axial outer portion to be able to exert the radial inward directed shearing force onto the break segments 32, while on the other hand cause its axial inner portion to be able to subsequently exert the radial inward directed clamping force onto the gap filling part 30.

Thus with this type of check ring 12, the breaking free of the break segments 32 has also been caused by the press tool 22 moving gradually radially inward during the pressing action, causing the limitation edge 12 to automatically come to abut against the break segments 32 and start to exert said shearing force onto them in order to break them free.

Figure 15A:
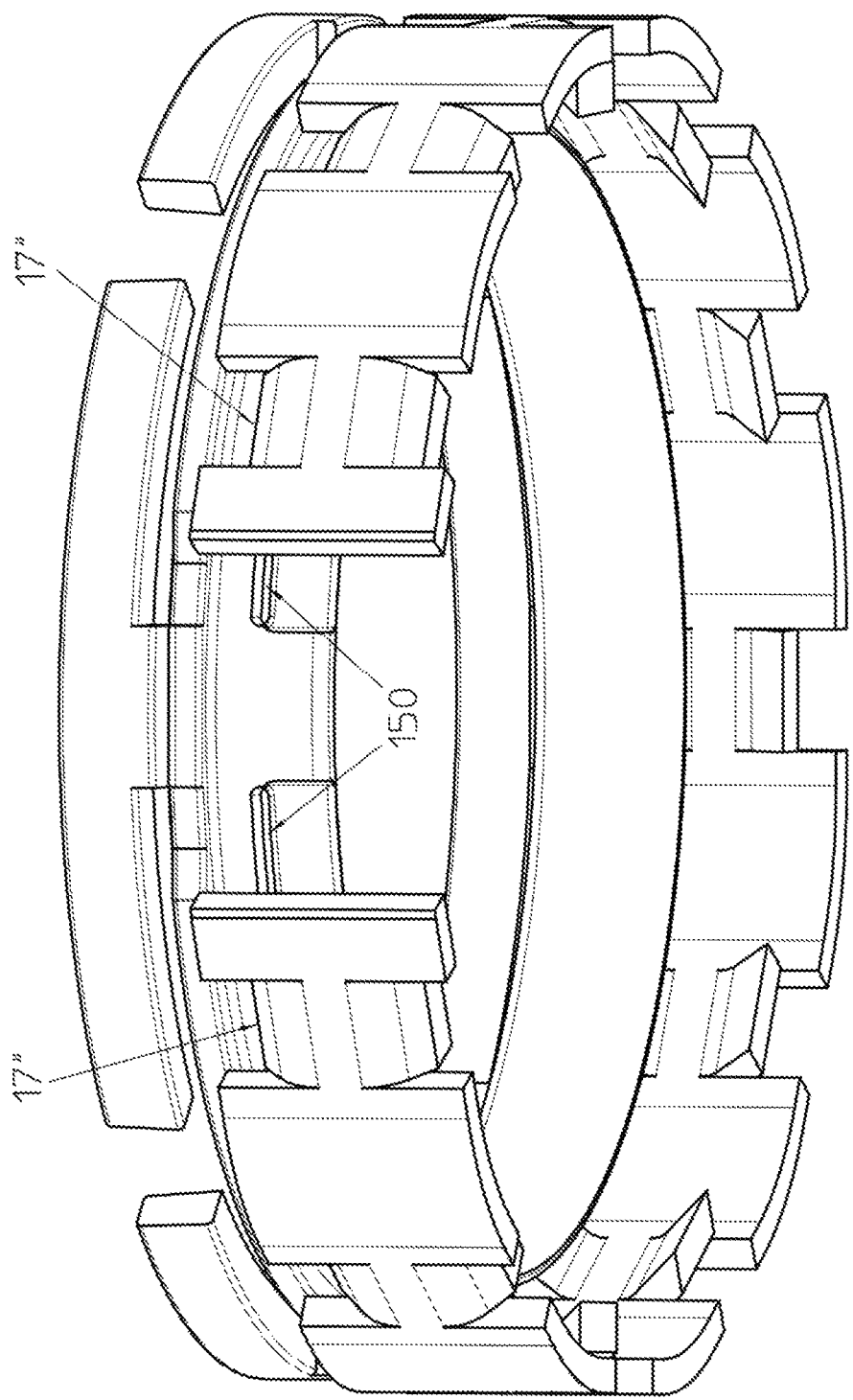

In FIG. 15 a further variant is shown of the assembly of the check ring 19 and gripping ring 17. The check ring 19 here comprises two circumferentially extending slit sections 150 in a radial outer wall of its coupling part 27 at a position between its snap edge 28 and gap filling part 30. The gripping ring 17, that is formed as a split gripping ring, then is able to grip with its two outer teeth 17" that lie adjacent the free ends of the gripping ring 17, into those slit sections 150. Thus those two outer teeth 17" are unable to get pressed through the plastic material of the gripping ring 17 during a pressing action, but are able to start to grip immediately into the inserted pipe end 4 instead. This is advantageous because the two outer teeth 17" during the pressing action have a tendency to move along the circumferential direction (tangentially) substantially more than the other teeth 17', which moving could otherwise cause them to drag plastic material of the check ring 19 along with them, because of which the coupling part 27 of the check ring 12 could start to deform outwardly and/or because of which a neighbouring break segment 32 could otherwise be prevented from breaking free.

In order to be able to more easily position the check ring 19 during its assembly onto the gripping ring 17 in such a way that the two outer teeth 17" get to grip into the slit sections 150, the check ring 19 can be provided with a positioning cam 155 on the outer circumference of its coupling part 27, which positioning cam 155 then can get positioned in an opening that is present between the free ends of the gripping ring 17. This cam 155 is shown in FIG. 16.

Figure 16:
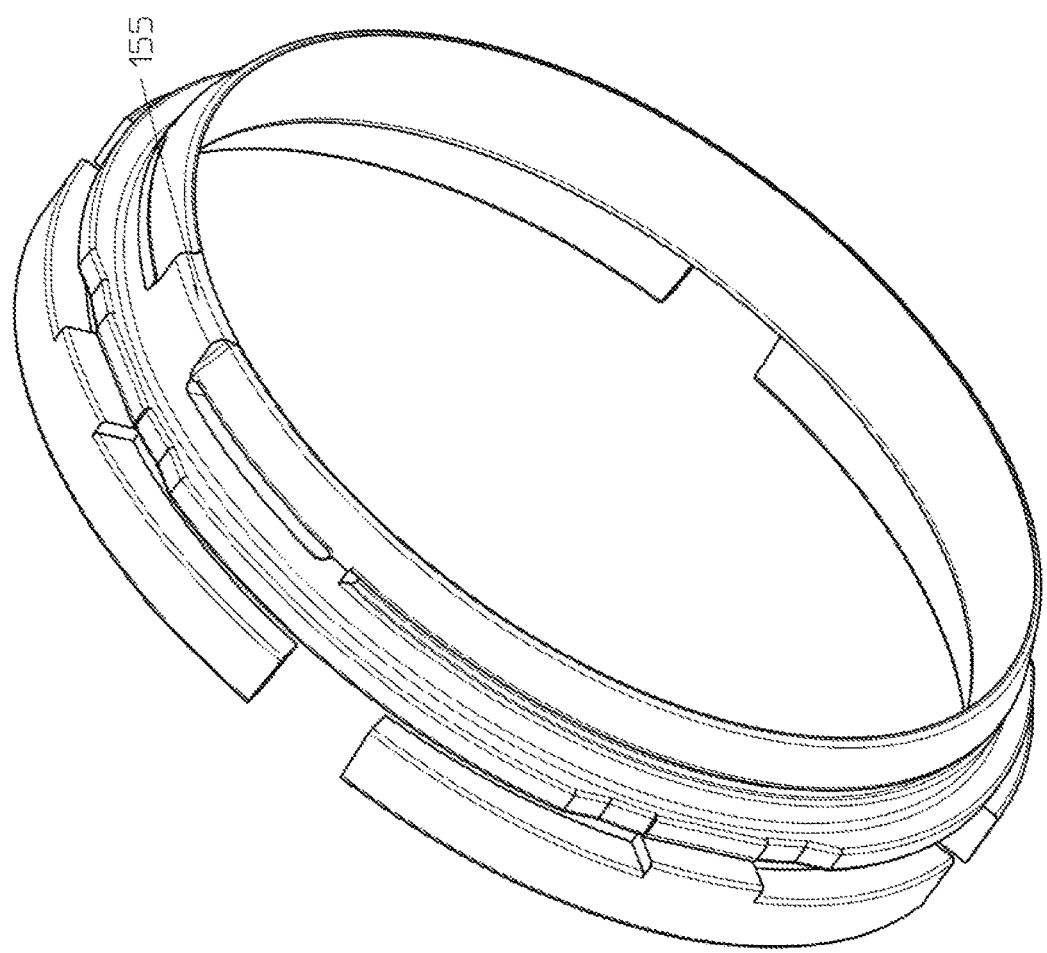
FIG. 16 shows an even further variant of this check ring with a positioning cam.
Figure 16A:
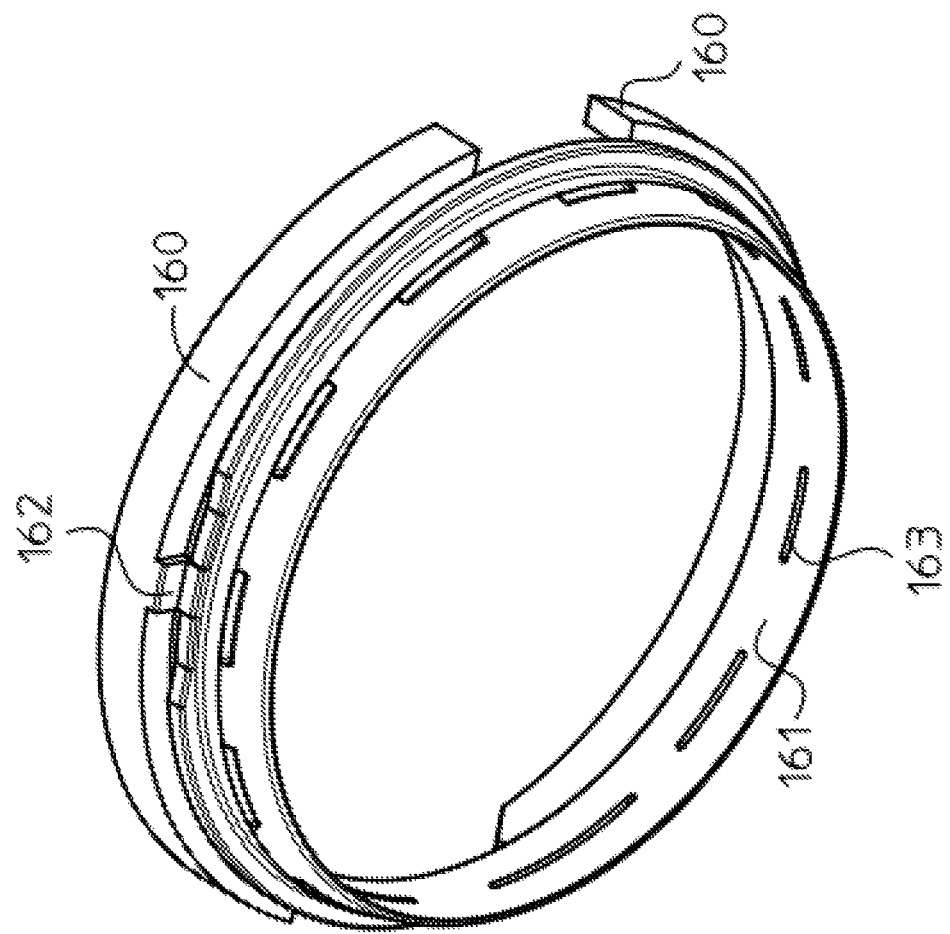
FIG. 16a shows a variant of this check ring of FIG. 16 with slit sections for each of axial outward teeth of a gripping ring.

In FIG. 16*a* a variant is shown of the check ring in FIG. 16. The check ring here comprises merely two interspaced semi-circular break segments 160 which are each connected to a ring-shaped coupling part 161 by means of a single separation part 162 that is provided in between a centre position of the break segments 160 and the coupling part 161. The coupling part 161 itself now comprises circumferentially extending slit sections 163 divided around the entire circumference thereof. For each of the axial outward teeth 17' of the gripping ring 17 a respective slit section 163 has been provided in the check ring. Thus the gripping ring 17 is advantageously able to grip with all of its axial outward teeth 17' into and through those slit sections 163 and none of the axial outward teeth 17' has to cut through the plastic material of the gripping ring 17 during a pressing action. Instead all of them are able to start to grip immediately into the inserted pipe end 4. This has appeared to further improve the aimed behaviour of the check ring during a pressing action.

In FIG. 16*a* some of the slit sections 163 have been given lengths that are substantially equal to the width of the teeth 17', whereas others have been given lengths that are larger than those widths of the teeth 17'. Only there where the teeth 17' are expected to have a tendency to move somewhat along the circumferential direction (tangentially) during a pressing action, that is to say closest to the free ends of the gripping ring 17, respective slit sections 163 have been given those greater lengths. Thus the check ring is kept as strong as possible.

Figure 17:
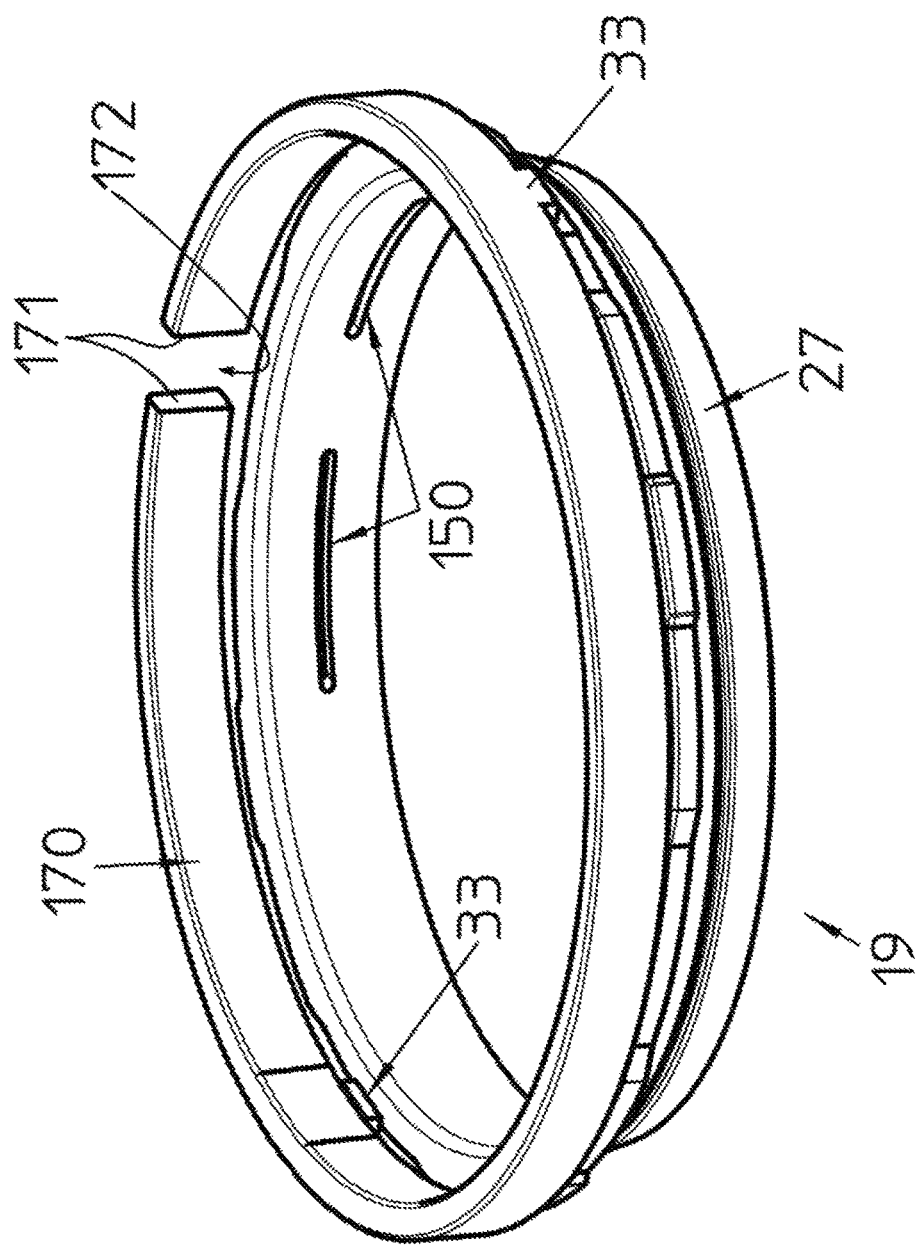
FIG. 17 shows a variant of the check ring with an open ring-shaped break segment.

Besides the check ring 19 being equipped with four break segments it is also possible for the check ring 19 to comprise any other suitable number of break segments. FIG. 17 shows a variant hereof in which merely one break segment is provided that here is formed by an open ring-shaped break segment 170 with two opposing outer ends 171 between which an opening 172 is provided. The ring-shaped break segment 170 is connected by means of separations parts 33 to a coupling part 27 of the check ring. The opening 172 is chosen smaller than the outer diameter of the pipe end 4 such that it is guaranteed that the ring-shaped break segment 170, after being broken free from the coupling part 27, remains hanging on the pipe end 4. Thus a risk for the break segment to jump away is efficiently prevented. The open ring-shaped break segment 170 can easily be removed from the pipe end 4 in a subsequent step, for example by the user pulling it of the pipe end while forcing the ring-shaped break segment

170 to flex open such that its outer ends 171 get to slide alongside the outer wall of the pipe end 4.

Figure 18:
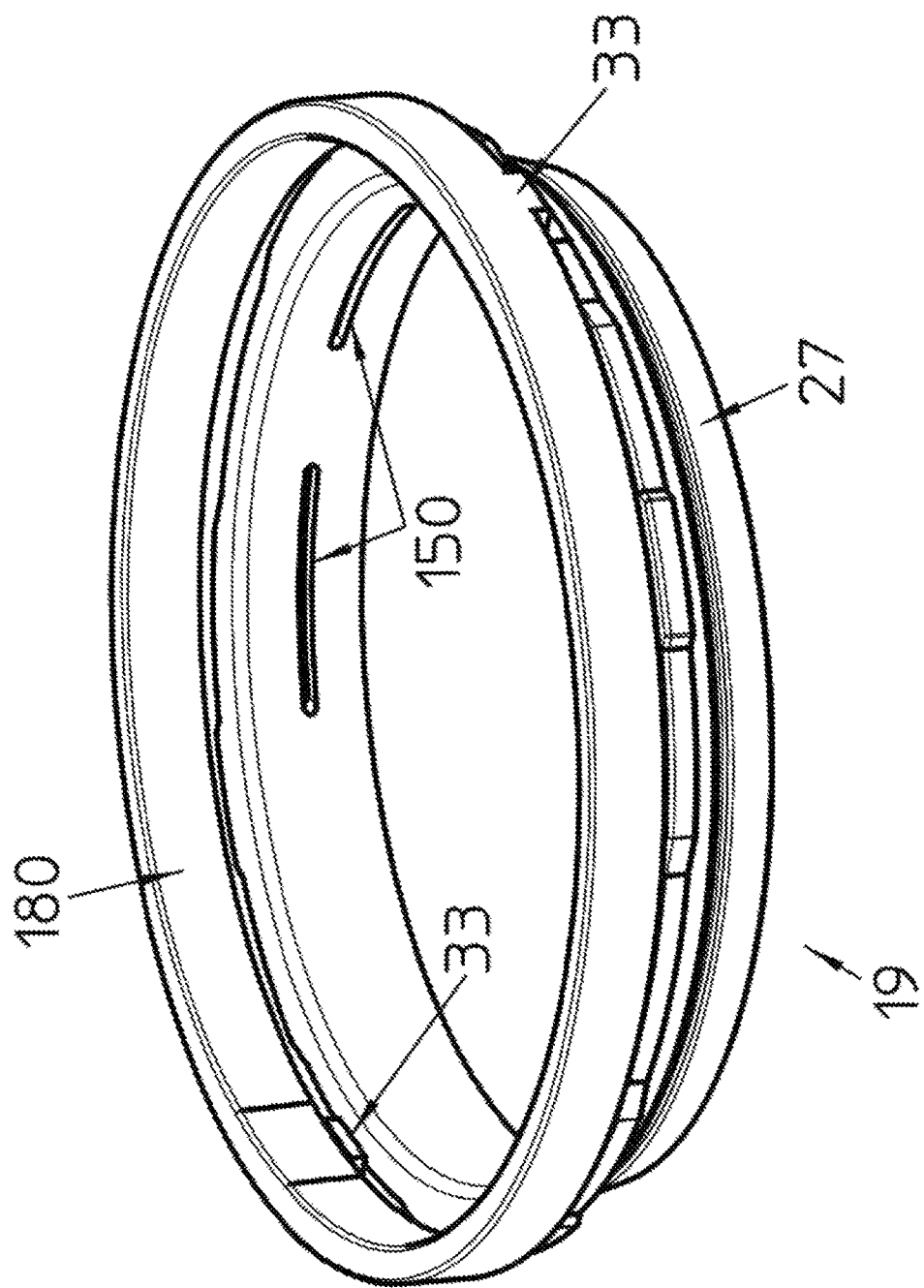
FIG. 18 shows a variant of the check ring with a closed ring-shaped break segment.

In FIG. 18 a variant is shown with a closed ring-shaped break segment 180. Here also it is guaranteed that the ring-shaped break segment 180, after being broken free from the coupling part 27, remains hanging around the pipe end 4. The closed ring-shaped break segment 180 can easily be removed from the pipe end 4 in a subsequent step, for example by the user then breaking or shearing the ring-shaped break segment 180 into parts. For making this subsequent breaking into parts somewhat easier, the ring-shaped break segment 180 can be provided with one or more weakenings.

Besides the embodiments shown numerous variants are possible. For example the types, shapes and dimensions of the alignment, sealing, spacer and gripping rings can be changed. Instead of the check ring being made as an integral ring of one same material, it can also be made out of several parts which have been connected to each other in some kind of manner. The check ring can also be given other cross sectional shapes and dimensions, and can be made out of other materials. Instead of the groove-shaped space being machined into the socket it can also be formed by a widened wall part with an inwardly flared outer edge. The socket can be closed at the side of the insert region, or be provided with means for connecting a pipe end or the like thereto. For example it can also be equipped with a second set of a press and insert region according to the invention for inserting and connecting another pipe end thereto in a similar manner as described above. The gripping ring can also be provided with other means for gripping into or onto the pipe end, and for example may also comprise merely one row of grasping teeth or the like.

Thus the invention provides a press fitting which can easily be assembled and which after a pipe end has been inserted into it, can easily and reliably be pressed into a compressed state, in which an check ring is able to perform a multiple of functions at the same time, namely of guiding, aligning, shielding, and controlling/checking, while also aiding in properly sealing the socket relative to the pipe end and keeping it sealed.

The invention claimed is:

1. A press fitting for pipes, comprising:
   a socket with an insertion space with an insert opening for having a pipe end inserted therein, the insertion space having a press region which is delimited by a substantially cylindrical press wall part;
   an annular groove-shaped space present in the press wall part, which annular groove-shaped space towards the insert opening is delimited by a radially inwardly projecting limitation edge of the press wall part; and
   a gripping ring placed in the annular groove-shaped space;
   wherein the press region is deformable from a non-compressed state towards a compressed state by a radially inward directed pressing action causing the press wall part to radially compress and the gripping ring to grip an inserted pipe end,
   wherein a check ring is provided at the side of the insert opening, which check ring comprises one or more break segments and a coupling part which lies at least partly in between the limitation edge and the inserted pipe end, and
   wherein the one or more break segments are connected to the coupling part by means of one or more separation parts such that the one or more break segments are forced to break free along those one or more separation parts from the coupling part by said pressing action, while the coupling part comes to lie visible at least partly in between the limitation edge and the inserted pipe end.

2. The press fitting according to claim 1, wherein the one or more break segments are formed by one or more segments which at least partly lie alongside at least part of the limitation edge.

3. The press fitting according to claim 1, wherein the one or more break segments extend at least partly outside the insertion space.

4. The press fitting according to claim 1, wherein the one or more break segments extend at least partly inside the insertion space.

5. The press fitting according to claim 1, wherein the one or more break segments have an outer diameter which is equal to or smaller than an outer diameter of the limitation edge and press wall part, and wherein the one or more break segments have an inner diameter which is larger than an outer diameter of an inserted pipe end.

6. The press fitting according to claim 1, wherein at least the separation parts of the check ring are made out of a brittle material.

7. The press fitting according to claim 1, wherein the coupling part of the check ring comprises a substantially cylindrical inner guidance wall part for guiding and aligning the pipe end during insertion and pressing action.

8. The press fitting according to claim 1, wherein the gripping ring comprises a plurality of interspaced grasping teeth, wherein, in the non-compressed state, at least some of the grasping teeth are covered towards the insertion space by the coupling part of the check ring.

9. The press fitting according to claim 8, wherein the gripping ring comprises an axial inward and outward row of the grasping teeth, wherein the coupling part of the check ring covers only the axially outward row towards the insertion space.

10. The press fitting according to claim 9, wherein the grasping teeth of the axial inward row are positioned axially slanted inward, whereas the grasping teeth of the axial outward row are positioned axially slanted outward.

11. The press fitting according to claim 1, wherein the coupling part of the check ring in the non-compressed state couples with the gripping ring.

12. The press fitting according to claim 8, wherein a space is present between the two rows of grasping teeth, into which space the coupling part of the check ring extends.

13. The press fitting according to claim 1, wherein the coupling part of the check ring comprises a gap filling part which extends outside the groove shaped space and is designed to, in the compressed state, substantially fill up or substantially shield of a gap between the inserted pipe end and the limitation edge.

14. The press fitting according to claim 13, wherein the gap filling part is dimensioned to, in the non-compressed state, lie radially interspaced from the limitation edge, and, in the compressed state, lie radially substantially against the limitation edge.

15. The press fitting according to claim 1, wherein limitation edge is a substantially continuous radially inwardly projecting edge of the press wall part.

16. The press fitting according to claim 1, further comprising a sealing ring being placed in the annular groove-shaped space.

17. The press fitting according to claim 1, wherein the one or more break segments comprise an open or closed ring-shaped break segment.

18. An assembly of a press fitting according to claim 1 and a pipe end inserted therein.

19. A method for pressing a press fitting according to claim 1, comprising the steps of:
    inserting a pipe end in the insertion space of the socket; and
    deforming the press region from a non-compressed state towards a compressed state by a radially inward directed pressing action causing the press wall part to radially compress and the gripping ring to grip the inserted pipe end,
    wherein, the one or more break segments are forced to break free along the one or more separation parts from the coupling part of the check ring by said pressing action, while the coupling part comes to lie visible at least partly in between the limitation edge and the inserted pipe end in said compressed state.

20. The press fitting according to claim 3, wherein the one or more break segments lie at least partly substantially flat against an axial outer wall of the limitation edge.

21. The press fitting according to claim 4, wherein the one or more break segments lie at least partly alongside a radial inner wall of the limitation edge.

22. The press fitting according to claim 5, wherein the inner diameter which is 2.5-5 mm larger than the outer diameter of the inserted pipe end.

23. The press fitting according to claim 6, wherein at least the separation parts of the check ring are made out of a glass fibre reinforced plastic.

24. The press fitting according to claim 11, wherein the coupling part of the check ring in the non-compressed state couples with the gripping ring with a snap fit.

25. The press fitting according to claim 14, wherein the gap filling part is dimensioned to, in the compressed state and while being clamped, lie radially substantially against the limitation edge.

26. The press fitting according to claim 16, further comprising a spacer ring being placed between the sealing ring and the gripping ring.

* * * * *